US011948423B2

(12) United States Patent
Petersen et al.

(10) Patent No.: US 11,948,423 B2
(45) Date of Patent: *Apr. 2, 2024

(54) SYSTEM AND METHOD FOR UTILIZING MOBILE DEVICE APPLICATION TO LOCATE ELECTRONIC GAMING MACHINES

(71) Applicant: IGT, Las Vegas, NV (US)

(72) Inventors: Erik Petersen, Reno, NV (US); Kevin Higgins, Reno, NV (US); Christopher M. Levin, Reno, NV (US)

(73) Assignee: IGT, Las Vegas, NV (US)

(*) Notice: Subject to any disclaimer, the term of this patent is extended or adjusted under 35 U.S.C. 154(b) by 0 days.

This patent is subject to a terminal disclaimer.

(21) Appl. No.: 18/106,868

(22) Filed: Feb. 7, 2023

(65) Prior Publication Data

US 2023/0196872 A1 Jun. 22, 2023

Related U.S. Application Data

(63) Continuation of application No. 16/935,341, filed on Jul. 22, 2020, now Pat. No. 11,587,395, which is a continuation of application No. 16/038,901, filed on Jul. 18, 2018, now abandoned.

(51) Int. Cl.
*G07F 17/32* (2006.01)

(52) U.S. Cl.
CPC ........ *G07F 17/323* (2013.01); *G07F 17/3223* (2013.01); *G07F 17/3262* (2013.01)

(58) Field of Classification Search
CPC . G07F 17/323; G07F 17/3223; G07F 17/3262
See application file for complete search history.

(56) References Cited

U.S. PATENT DOCUMENTS

| | | | |
|---|---|---|---|
| 6,846,238 | B2 | 1/2005 | Wells |
| 7,040,987 | B2 | 5/2006 | Walker et al. |
| 7,883,417 | B2 | 2/2011 | Bruzzese et al. |
| 8,506,395 | B2 | 8/2013 | Bytnar et al. |
| 8,523,682 | B2 | 9/2013 | Bickley |
| 8,602,882 | B2 | 12/2013 | Nguyen et al. |
| 8,747,219 | B2 | 6/2014 | Wright et al. |
| 8,758,120 | B2 | 6/2014 | Wright et al. |
| 8,777,732 | B2 | 7/2014 | Robbins et al. |
| 8,814,683 | B2 | 8/2014 | Hollander et al. |
| 8,944,916 | B2 | 2/2015 | Abouchar et al. |
| 9,153,095 | B2 | 10/2015 | Adiraju et al. |
| 9,679,437 | B2 | 6/2017 | Detlefsen et al. |
| 9,965,768 | B1 | 5/2018 | Doane et al. |

(Continued)

FOREIGN PATENT DOCUMENTS

| | | |
|---|---|---|
| WO | WO 2009042190 | 4/2009 |
| WO | WO 2011156475 | 12/2011 |

OTHER PUBLICATIONS

Allan Johnson, Routing Protocols and Concepts, 2008, Cisco Press. (Year: 2008).*

*Primary Examiner* — Werner G Garner
(74) *Attorney, Agent, or Firm* — Neal, Gerber & Eisenberg LLP

(57) ABSTRACT

The present disclosure relates generally to a system that utilizes an application running on a mobile device to notify a user of the state of an electronic gaming machine in wireless communication with the mobile device.

20 Claims, 6 Drawing Sheets

(56) References Cited

U.S. PATENT DOCUMENTS

| | | | |
|---|---|---|---|
| 10,134,195 | B2 | 11/2018 | Lyons et al. |
| 2001/0046891 | A1 | 11/2001 | Acres |
| 2003/0064805 | A1 | 4/2003 | Wells |
| 2003/0065805 | A1 | 4/2003 | Barnes, Jr. |
| 2003/0148812 | A1 | 8/2003 | Paulsen et al. |
| 2003/0224852 | A1 | 12/2003 | Walker et al. |
| 2004/0085293 | A1 | 5/2004 | Soper et al. |
| 2004/0137987 | A1 | 7/2004 | Nguyen et al. |
| 2004/0209690 | A1 | 10/2004 | Bruzzese et al. |
| 2005/0054438 | A1 | 3/2005 | Rothschild et al. |
| 2005/0059485 | A1 | 3/2005 | Paulsen et al. |
| 2005/0130728 | A1 | 6/2005 | Nguyen et al. |
| 2005/0213790 | A1 | 9/2005 | Rhoads et al. |
| 2006/0035707 | A1 | 2/2006 | Nguyen et al. |
| 2006/0154722 | A1 | 7/2006 | Walker et al. |
| 2006/0189382 | A1 | 8/2006 | Muir et al. |
| 2007/0042823 | A1 | 2/2007 | Shim |
| 2007/0054738 | A1 | 3/2007 | Muir |
| 2007/0135202 | A1 | 6/2007 | Linard et al. |
| 2007/0293293 | A1 | 12/2007 | Baerlocher et al. |
| 2008/0039197 | A1 | 2/2008 | Walker et al. |
| 2008/0058065 | A1 | 3/2008 | Okada |
| 2008/0076572 | A1 | 3/2008 | Nguyen et al. |
| 2008/0096628 | A1 | 4/2008 | Czyzewski et al. |
| 2008/0108435 | A1 | 5/2008 | Nelson et al. |
| 2008/0194323 | A1 | 8/2008 | Merkli et al. |
| 2008/0214166 | A1 | 9/2008 | Ramer et al. |
| 2008/0220878 | A1 | 9/2008 | Michaelis |
| 2008/0261682 | A1 | 10/2008 | Phillips et al. |
| 2008/0268934 | A1 | 10/2008 | Mattice et al. |
| 2008/0318655 | A1 | 12/2008 | Davies |
| 2009/0040370 | A1 | 2/2009 | Varanasi |
| 2009/0088243 | A1 | 4/2009 | Gagner et al. |
| 2009/0124376 | A1 | 5/2009 | Kelly et al. |
| 2009/0187463 | A1 | 7/2009 | DaCosta |
| 2009/0197684 | A1 | 8/2009 | Arezina et al. |
| 2009/0264190 | A1 | 10/2009 | Davis et al. |
| 2009/0265105 | A1 | 10/2009 | Davis et al. |
| 2010/0016052 | A1 | 1/2010 | Gagner et al. |
| 2010/0048291 | A1 | 2/2010 | Warkentin |
| 2010/0062840 | A1 | 3/2010 | Herrmann |
| 2010/0113161 | A1 | 5/2010 | Walker et al. |
| 2010/0227662 | A1 | 9/2010 | Speer, II et al. |
| 2010/0255912 | A1 | 10/2010 | Ward |
| 2010/0257252 | A1 | 10/2010 | Dougherty et al. |
| 2010/0323785 | A1 | 12/2010 | Motyl et al. |
| 2011/0045908 | A1 | 2/2011 | Ehrlich |
| 2011/0130197 | A1 | 6/2011 | Bytnar et al. |
| 2011/0159940 | A1 | 6/2011 | Acres |
| 2011/0159948 | A1 | 6/2011 | Anderson et al. |
| 2011/0183732 | A1 | 7/2011 | Block et al. |
| 2011/0183749 | A1 | 7/2011 | Allen et al. |
| 2011/0292076 | A1 | 12/2011 | Wither et al. |
| 2011/0306400 | A1 | 12/2011 | Nguyen |
| 2012/0015735 | A1 | 1/2012 | Abouchar et al. |
| 2012/0028714 | A1 | 2/2012 | Gagner et al. |
| 2012/0289313 | A1 | 11/2012 | Anderson et al. |
| 2012/0295696 | A1 | 11/2012 | Anderson et al. |
| 2012/0295697 | A1 | 11/2012 | Anderson et al. |
| 2012/0302326 | A1 | 11/2012 | Anderson et al. |
| 2013/0130781 | A1 | 5/2013 | Anderson |
| 2013/0130786 | A1 | 5/2013 | Robbins |
| 2013/0260882 | A1 | 10/2013 | Hamlin et al. |
| 2013/0337890 | A1 | 12/2013 | Earley et al. |
| 2014/0045586 | A1 | 2/2014 | Allen et al. |
| 2014/0141864 | A1 | 5/2014 | Ward et al. |
| 2014/0171206 | A1 | 6/2014 | Kelly |
| 2015/0045115 | A1* | 2/2015 | Kelly .................... G07F 17/323 463/25 |
| 2015/0111636 | A1 | 4/2015 | Saraf |
| 2016/0093135 | A1 | 3/2016 | Bond et al. |

* cited by examiner

1000

SYSTEM AND METHOD FOR UTILIZING MOBILE DEVICE APPLICATION TO LOCATE ELECTRONIC GAMING MACHINES

PRIORITY

This application is a continuation of, claims priority to and the benefit of U.S. patent application Ser. No. 16/935,341, filed on Jul. 22, 2020, which is a continuation of, claims priority to and the benefit of U.S. patent application Ser. No. 16/038,901, filed on Jul. 18, 2018, the entire contents of which are each incorporated by reference herein.

BACKGROUND

Gaming machines which provide players awards in primary or base games are well known. Gaming machines generally require the player to place or make a wager to activate the primary or base game. In many of these gaming machines, the award is based on the player obtaining a winning symbol or symbol combination and on the amount of the wager.

SUMMARY

In certain embodiments, the present disclosure relates to a gaming establishment component comprising a processor, and a memory device which stores a plurality of instructions, which when executed by the processor, cause the processor to receive data associated with a determined state of an electronic gaming machine. When executed by the processor, the instructions cause the processor to wirelessly broadcast electronic gaming machine state identifying data associated with the determined state of the electronic gaming machine, wherein when wirelessly received by a mobile device and responsive to an occurrence of an electronic gaming machine notification event, a mobile device application displays a notification associated with the determined state of the electronic gaming machine.

In certain embodiments, the present disclosure relates to a gaming establishment component comprising a processor, and a memory device which stores a plurality of instructions, which when executed by the processor, cause the processor to receive data associated with a determined state of an electronic gaming machine. When executed by the processor, the instructions cause the processor to communicate data associated with the determined state of the electronic gaming machine to a server which associates the data associated with the determined state of the electronic gaming machine with an identifier associated with the electronic gaming machine, and wirelessly broadcast the identifier associated with the electronic gaming machine, wherein when wirelessly received by a mobile device and responsive to an occurrence of an electronic gaming machine notification event following the mobile device receiving, from the server, the data associated with the determined state of the electronic gaming machine associated with the broadcasted identifier, a mobile device application displays a notification associated with the determined state of the electronic gaming machine.

In certain embodiments, the present disclosure relates to a method of operating a gaming establishment component comprising receiving data associated with a determined state of an electronic gaming machine, and wirelessly broadcasting electronic gaming machine state identifying data associated with the determined state of the electronic gaming machine, wherein when wirelessly received by a mobile device and responsive to an occurrence of an electronic gaming machine notification event, a mobile device application displays a notification associated with the determined state of the electronic gaming machine.

Additional features and advantages are described herein, and will be apparent from the following Detailed Description and the figures.

DETAILED DESCRIPTION

Figure 1:
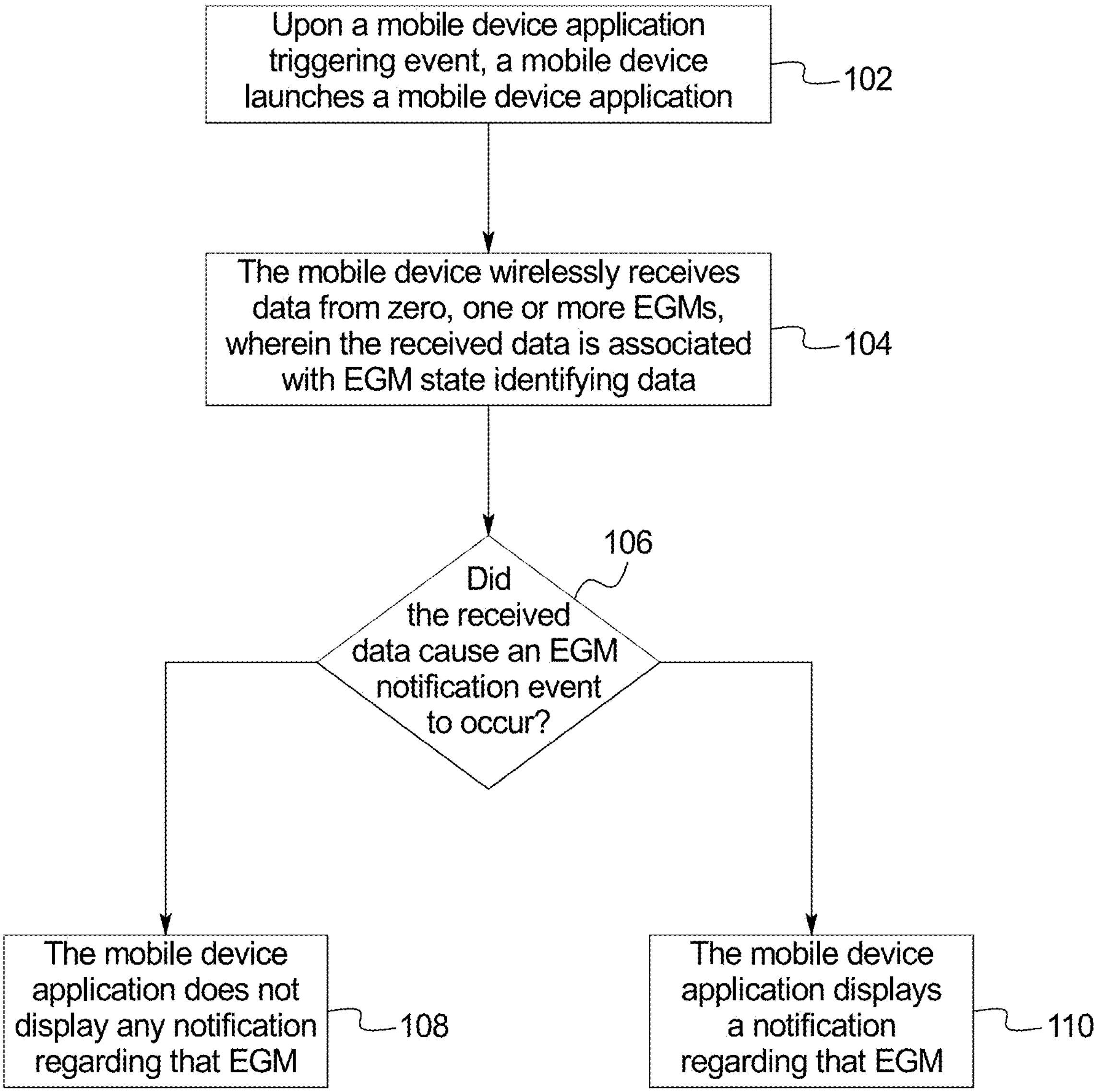
FIG. 1 is a flow chart of an example process for operating a system which displays zero, one or more notifications to a user of a mobile device based on state data received from one or more gaming establishment components.

In various embodiments, the system disclosed herein utilizes an application running on a mobile device to notify a user of the state of an electronic gaming machine ("EGM") in wireless communication with the mobile device. More specifically, the system of the present disclosure enables a mobile device running a mobile device application to communicate with different gaming establishment components, such as different EGMs, evaluate the state of such gaming establishment components and display to a user information associated with the evaluated state of such gaming establishment components. That is, the mobile device application determines one or more states of one or more gaming establishment components and informs the user of such determined states to assist the user in determining which gaming establishment component(s) to engage and which gaming establishment component(s) not to engage. Informing the user of the determines states of the various gaming establishment components within a gaming establishment saves the user considerable time by not having to go from gaming establishment component to gaming establishment component to access available information associated with such gaming establishment components. Such a mobile device application thus enhances a user's gaming experience by providing a real-time assessment of one or more gaming establishment components to more accurately reflect the state or status of different gaming establishment components, such as the gaming establishment components within a designated distance of the mobile device running the mobile device application, to enable different gaming establishment components to be located by a user of the mobile device application.

In certain embodiments, different gaming establishment components each utilize one or more available data fields supported by a suitable wireless communication protocol to broadcast to the mobile device application the different characteristics and capabilities of the gaming establishment components. In these embodiments, based on the data wirelessly received from one or more gaming establishment components (and specifically based on certain state identifying data regarding one or more gaming establishment components which is conveyed via one or more of such available data fields), the mobile device application displays varying information based on the gaming establishment component state identifying data associated with the available data fields. For example, a Bluetooth™ Low Energy ("BLE") enabled component of a gaming establishment management system, such as a slot machine interface board ("SMIB") supported by an EGM, broadcasts an advertising packet which informs a listening mobile device application within range of the capabilities, characteristics or attributes of that EGM. In this example, included in the broadcasted advertisement packet is supplemental data associated with a Service Data field which corresponds to one or more states or status of the EGM, such as a duration since that EGM provided a payout over a designated threshold and/or a duration since the EGM was placed on a gaming establishment gaming floor. In operation of this example, upon the mobile device receiving the advertisement packet including the supplemental data associated with the Service Data field, the mobile device application displays zero, one or more messages or notification to the user regarding the state or status that EGM, such as displaying to the user the duration since that EGM provided a payout over a designated threshold and/or the duration since the EGM was placed on a gaming establishment gaming floor. As such and as illustrated by this example, the present disclosure configures the wireless signal broadcast from one or more wireless transceivers to include supplemental data associated with one or more states of the gaming establishment component which transmitted that supplemental data, wherein such supplemental data enables a mobile device application to display to a user information corresponding to such one or more states of the gaming establishment component. Accordingly, the system disclosed herein enables a gaming establishment mobile device application to provide a user certain information regarding the states or statuses of various gaming establishment components, such as various EGMs, located throughout the different areas of a gaming establishment. Such a configuration provides that the same mobile device application displays different information responsive to encountering different gaming establishment components having different states or statuses conveyed via the supplemental data broadcasted by such different gaming establishment components.

FIG. 1 is a flowchart of an example process or method of operating the system of the present disclosure. In various embodiments, the process is represented by a set of instructions stored in one or more memories and executed by one or more processors. Although the process is described with reference to the flowchart shown in FIG. 1, many other processes of performing the acts associated with this illustrated process may be employed. For example, the order of certain of the illustrated blocks or diamonds may be changed, certain of the illustrated blocks or diamonds may be optional, or certain of the illustrated blocks or diamonds may not be employed.

In certain embodiments, upon a mobile device application triggering event, the mobile device launches a mobile device application as indicated in block 102.

In certain embodiments, the mobile device application is a location based digital wallet enabled application, such as a Passbook-enabled or Wallet-enabled application, which is accessible when the player enters a gaming establishment. In one such embodiment, the mobile device application triggering event occurs when the player enters the gaming establishment. In certain embodiments, the mobile device application is downloaded to the mobile device from an application store. In another embodiment, the mobile device application is downloaded to the mobile device from one or more websites or application stores affiliated with the gaming establishment (which are accessible directly by the player's mobile device and/or by a link opened when the user or player scans a QR code associated with an EGM, a point-of-sale terminal associated with the gaming establishment or any location-designating display).

In certain embodiments, following or otherwise in association with the launching of the mobile device application, as indicated by block 104, the mobile device wirelessly receives data from zero, one or more EGMs, wherein the received data is associated with EGM state identifying data. In these embodiments, each EGM (or each component of a gaming establishment management system, such as SMIB supported by an EGM) includes a wireless transceiver that broadcasts and/or receives wireless data. In different embodiments, to transmit and/or receive data, the EGMs (or components of the gaming establishment management system supported by the EGMs) utilize any suitable wireless communication protocol, including, but not limited to: Bluetooth™, Bluetooth™ Low Energy ("BLE"), one or more cellular communication standards (e.g., 3G, 4G, LTE), one or more Wi-Fi compatible standards, and one or more short range communication protocols (e.g., a near field communication ("NFC") protocol).

In certain embodiments, the data broadcasted by the EGM (or a component of a gaming establishment management system supported by the EGM) includes connection data, such as data associated with a presence of the EGM (or the component of a gaming establishment management system supported by the EGM) and a readiness, if applicable, for the EGM (or the component of a gaming establishment management system supported by the EGM) to accept a connection with the mobile device application.

In certain embodiments, the data broadcasted by the EGM (or the component of a gaming establishment management system supported by the EGM) additionally or alternatively includes or is otherwise associated with EGM state identifying data (i.e., supplemental data), such as data associated with one or more games being offered by that EGM. For example, an EGM (or the component of a gaming establishment management system supported by the EGM) in advertising mode utilizes a BLE transceiver to periodically transmit both connection data (i.e., a presence of the EGM and a readiness of the EGM to accept a connection with a Bluetooth enabled mobile device) and EGM state identifying data as part of an advertising packet. In this example, the EGM utilizes a service data field of the advertising packet to transmit up to 10-bytes of arbitrary binary data associated with the state of the EGM. As illustrated by this example, since the BLE advertising packet includes various data fields and not all of the data fields are utilized by the EGM (or the component of a gaming establishment management system supported by the EGM) to transmit connection data, the present disclosure utilizes one or more of these otherwise unused data fields to transmit the EGM state identifying data.

In certain embodiments, the EGM state identifying data is associated with game data of the EGM. In these embodiments, the EGM state identifying data pertains to one or more aspects or parameters of one or more games, such as primary games and/or bonus games, being offered for play by that EGM. In one example, the EGM state identifying data includes data corresponding to the theme of one or more games being offered for play by that EGM. In another example, the EGM state identifying data includes data corresponding to one or more paytables utilized by that EGM to determine one or more payout of one or more games. In another example, the EGM state identifying data includes data corresponding to one or more gameplay features associated with one or more games being offered for play by that EGM. In various embodiments, such gameplay features include, but are not limited to: a multiplier wild symbol feature, a modifier, such as a multiplier, feature, a symbol accumulation feature, a book-end wild symbols feature, a stacked wild symbols feature, an expanding wild symbols feature, a nudging wild symbols feature, a retrigger symbol feature, an anti-terminator symbol feature, a locking reel feature, a locking symbol position feature, a feature modifying an amount of credits of a credit balance, a feature modifying an amount of promotional credits, a feature modifying a placed wager amount, a feature modifying a placed side wager amount, a feature modifying a rate of earning player tracking points, a feature modifying a number of wagered on paylines, a feature modifying a wager placed on one or more paylines (or on one or more designated paylines), a feature modifying a number of ways to win wagered on, a feature modifying a wager placed on one or more ways to win (or on one or more designated ways to win), a feature modifying a paytable utilized for a play of a game, a feature modifying an average expected payback percentage of a play of a game, a feature modifying an average expected payout of a play of a game, a feature modifying one or more awards available, a feature modifying a range of awards available, a feature modifying a type of awards available, a featuring awarding a progressive award, a feature modifying one or more progressive awards, a feature modifying which progressive awards are available to be won, a feature modifying one or more modifiers, such as multipliers, available, a feature modifying an activation of a reel (or a designated reel), a feature modifying an activation of a plurality of reels, a feature modifying a generated outcome (or a designated generated outcome), a feature modifying a generated outcome (or a designated generated outcome) associated with an award over a designated value, a feature modifying a generated outcome (or a designated generated outcome) on a designated payline, a feature modifying a generated outcome (or a designated generated outcome) in a scatter configuration, a feature modifying a winning way to win (or a designated winning way to win), a feature modifying a designated symbol or symbol combination, a feature modifying a generation of a designated symbol or symbol combination on a designated payline, a feature modifying a generation of a designated symbol or symbol combination in a scatter configuration, a feature modifying a triggering event of a play of a secondary or bonus game, a feature modifying an activation of a secondary or bonus display (such as an award generator), a feature modifying a quantity of activations of a secondary or bonus display (e.g., a feature modifying a quantity of spins of an award generator), a feature modifying a quantity of sections of a secondary or bonus display (e.g., a feature modifying a quantity of sections of an award generator), a feature modifying one or more awards of a secondary or bonus display, a feature modifying an activation of a community award generator, a feature modifying a quantity of activations of a community award generator, a feature modifying a quantity of sections of a community award generator, a feature modifying one or more awards of a community award generator, a feature modifying a generated outcome (or a designated generated outcome) in a secondary game, a feature modifying a quantity of picks in a selection game, a feature modifying a quantity of offers in an offer and acceptance game, a feature modifying a quantity of moves in a trail game, a feature modifying an amount of free spins provided, a feature modifying a game terminating or ending condition, and/or a feature modifying any game play feature associated with any play of any game disclosed herein.

In certain embodiments, the EGM state identifying data is additionally or alternatively associated with persistent gameplay data of the EGM. In these embodiments, the EGM state identifying data pertains to the status of one or more persistent gameplay aspects of the EGM. For example, the EGM state identifying data includes data corresponding to a status of a bonus game which includes one or more bonus game elements which persist from play to play of the bonus game.

In certain embodiments, the EGM state identifying data is associated with historical gameplay data of the EGM. In these embodiments, the EGM state identifying data pertains to the historical gameplay performance of the EGM. In one example, the EGM state identifying data includes data corresponding to one or more payouts provided by that EGM (or alternatively an average payout provided per game played) over a duration (expressed as an amount of time, a quantity of games played, a quantity of designated wagers placed, and/or a quantity of players whom have played such games). In another example, the EGM state identifying data includes data corresponding to a duration (expressed as an amount of time, a quantity of games played, a quantity of designated wagers placed, and/or a quantity of players whom have played such games) since one or more events occurred at the EGM, such as since the EGM paid out a designated award of a progressive award or an award of at least a threshold value.

In certain embodiments, the EGM state identifying data is associated with setting data of the EGM. In these embodiments, the EGM state identifying data pertains to one or more settings (or other identifiers) of the EGM, such as but not limited to: a volume selection setting, a screen brightness setting, a wager selection setting, a denomination selection setting, an auto-play setting, a double-up setting, a value selection setting, a payline selection setting, a multi-play selection setting, an asset number of the EGM, a unique identifier of the EGM, floor location information (e.g., area, zone, and/or bank location information), EGM manufacturer information, and/or software version information.

In certain embodiments, the EGM state identifying data is additionally or alternatively associated with ongoing promotional data of the EGM. In these embodiments, the EGM state identifying data pertains to the status of one or more ongoing promotional aspects of the EGM. For example, the EGM state identifying data includes data corresponding to a status of a promotion associated with that EGM, such as a duration remaining of the promotion and/or one or more benefits available as part of the ongoing promotion.

In certain embodiments, the EGM state identifying data is associated with historical promotional data of the EGM. In these embodiments, the EGM state identifying data pertains to the historical promotional performance of the EGM. In one example, the EGM state identifying data includes data corresponding to one or more promotional payouts provided by that EGM over a duration expressed as an amount of time or a quantity of games played.

In certain embodiments, the EGM state identifying data is associated with non-gameplay service data of the EGM. In these embodiments, the EGM state identifying data pertains to one or more services offered by the EGM (or by a gaming establishment management system component associated with the EGM) which are distinct from a play of a game. In various embodiments, such offered services include, but are not limited to: obtaining an offer, ordering a drink, making a reservation at a restaurant, modifying a reservation at a restaurant, making entertainment reservations, modifying entertainment reservations, learning information about various hotels, gaming establishments, restaurants, entertainment and/or travel services, making a reservation to play a particular EGM, modifying a reservation to play a particular EGM, accessing a gaming establishment resort account, such as a cashless wagering account and/or a gaming establishment retail account, transferring funds (either as cashless credits, non-cashable credits, promotional funds) from one gaming establishment account to another gaming establishment account (such as described in U.S. Published Patent Application No. 2017/0092054), enrolling in a player tracking system (i.e., a loyalty program), logging a player into a gaming establishment loyalty account, such as a player tracking system account, logging a player out of a gaming establishment loyalty account, redeeming comps associated with a player tracking system, checking a quantity of player tracking points, updating the user's information, redeeming qualified promotions or bonuses, purchasing a lottery ticket, purchasing a sporting event wagering ticket, communicating with another user, communicating with a host or gaming establishment employee, reporting a malfunction of an EGM, calling for service of an EGM, searching for a specific player/EGM, joining a tournament, joining a progressive event, forming a group with one or more other players, accessing a score card of accomplished events, and/or accessing a tournament leader board.

In certain embodiments, the EGM state identifying data is additionally or alternatively associated with historical placement data of the EGM. For example, the EGM state identifying data includes data corresponding to a duration since that EGM was placed on a gaming establishment gaming floor and/or moved to a current location on the gaming establishment gaming floor.

It should be appreciated that while the EGM state identifying data is described as being associated with one or more of the game data of the EGM, the historical gameplay data of the EGM, the persistent gameplay data of the EGM, the ongoing promotional data of the EGM, the historical promotional data of the EGM, the setting data of the EGM, the non-gameplay service data of the EGM and/or the historical placement data of the EGM, any data which conveys information associated with any aspect of the EGM (or any gaming establishment component associated with the EGM) may be included in the EGM state identifying data.

In certain embodiments, the EGM (or a component of a gaming establishment management system associated with the EGM) broadcasts in the available data field, such as the service data field, of the advertising packet the EGM state identifying data. In these embodiments, the wireless transceiver in an EGM utilizes one or more available data fields to broadcast to any listening devices EGM state identifying data of that EGM, such as the game data of the EGM, the historical gameplay data of the EGM, the persistent gameplay data of the EGM, the ongoing promotional data of the EGM, the historical promotional data of the EGM, the setting data of the EGM, the non-gameplay service data of the EGM and/or the historical placement data of the EGM. In certain embodiments, as described in more detail below, the EGM (or a component of a gaming establishment management system associated with the EGM) broadcasts in the available data field, such as the service data field, of the advertising packet one or more identifiers associated the EGM. In these embodiments, the mobile device application (and/or one or more servers in communication with the mobile device application) access one or more databases to look up the EGM state identifying data of that EGM, such as the game data of the EGM, the historical gameplay data of the EGM, the persistent gameplay data of the EGM, the ongoing promotional data of the EGM, the historical promotional data of the EGM, the setting data of the EGM, the non-gameplay service data of the EGM and/or the historical placement data of the EGM.

In various embodiments, following the receipt of data from zero, one or more EGMs, the mobile device application and before, during and/or after the mobile device communicatively connects to zero, one or more EGMs (or zero, one or more components of a gaming establishment management system associated with such EGMs), the mobile device application determines whether the received data caused an EGM notification event to occur as indicated by diamond 106.

In certain embodiments, the mobile device application EGM notification event occurs when the received EGM state identifying data is different from previous EGM state identifying data received by the mobile device application. That is, the mobile device application (and/or one or more servers in communication with the mobile device application) compares current EGM state identifying data to prior EGM state identifying data to determine whether any changes in the state or status of the EGM occurred and whether such changes warrant notifying the user of the mobile device application about.

For example, the mobile device application determines whether received data associated with a game theme of an EGM (i.e., EGM state identifying data of game data) has been previously received by the mobile device. In this example, by determining that no data associated with a game theme of an EGM was previously received by the mobile device, the mobile device application determines that the EGM is a new EGM (at least to the user of the mobile device application) and thus a mobile device application EGM notification event occurred in association with this new EGM. On the other hand, by determining that data associated with the game theme of the EGM was previously received by the mobile device, the mobile device application determines that the EGM is not a new EGM (at least to the user of the mobile device application) and thus no mobile device application EGM notification event occurred in association with this EGM.

In another example, the mobile device application determines whether received historical placement data of an EGM predates the last time the mobile device launched the mobile device application. In this example, by determining that the EGM was placed on the gaming establishment floor since the last time the mobile device launched the mobile device application (or since the mobile device application launched while located within a gaming establishment), the mobile device application determines that the EGM is a new EGM (at least to the user of the mobile device application) and thus a mobile device application EGM notification event occurred in association with this new EGM.

In certain embodiments, the mobile device application EGM notification event occurs based on the received EGM state identifying data satisfying one or more conditions. That is, the mobile device application (and/or one or more servers in communication with the mobile device application) compares the EGM state identifying data to one or more predetermined thresholds of such data to determine whether any thresholds have been met that warrant notifying the user of the mobile device application about.

For example, the mobile device application determines whether received data associated with a duration since an EGM paid out an award over a designated value (i.e., EGM state identifying data of historical gameplay data) is within a designated amount of time, such as two days, (or a designated quantity of games played, such as 500 games played). In this example, by determining that the EGM paid out an award over the designated value within the designated amount of time (or the designated quantity of games played), the mobile device application determines that the EGM is a "hot" EGM and thus a mobile device application EGM notification event occurred in association with this "hot" EGM. In this example, by determining that the EGM did not pay out any award over the designated value within the designated amount of time (or the designated quantity of games played), the mobile device application determines that the EGM is not a "hot" EGM and thus no mobile device application EGM notification event occurred in association with this EGM.

In another example, the mobile device application determines whether received data associated with a duration since an EGM paid out an award of at least a designated value (i.e., EGM state identifying data of historical gameplay data) is within a designated amount of time, such as five days, (or a designated quantity of games played, such as 2500 games played). In this example, by determining that the EGM failed to pay out an award of at least the designated value within the designated amount of time (or the designated quantity of games played), the mobile device application determines that the EGM is a "cold" EGM and thus a mobile device application EGM notification event occurred in association with this "cold" EGM. In this example, by determining that the EGM paid out an award of at least the designated value within the designated amount of time (or the designated quantity of games played), the mobile device application determines that the EGM is not a "cold" EGM and thus no mobile device application EGM notification event occurred in association with this EGM.

In various embodiments, the system enables a user of the mobile device application to set one or more standards to filter out certain EGM state identifying data or otherwise adjust how different EGMs qualify for certain statuses. That is, the mobile device application enables a user to modify one or more thresholds or other criteria used to determine if a mobile device application notification event occurred. Continuing with the above example, the mobile device application enables a user to utilize the mobile device application to modify the threshold of a "cold" EGM from an EGM that has not paid out an award of at least a designated value (which may be user modifiable as well) in the past five days to an EGM that has not paid out an award of a least a designated value in the past ten days.

In certain embodiments, the mobile device application EGM notification event occurs based on the received EGM state identifying data matching any user defined parameters. That is, the system compares the EGM state identifying data to one or more user defined parameters to determine whether any matches occur that warrant notifying the user of the mobile device application about.

For example, the mobile device application determines whether received data associated with a game theme of an EGM (i.e., EGM state identifying data of game data) matches a game theme previously identified by the user of the mobile device application as a favorite game theme (or a game theme the user wants to play). In this example, by determining that the received game theme data matches a game theme previously identified by the user of the mobile device application as a favorite game theme (or a game theme the user wants to play), the mobile device application determines that a mobile device application EGM notification event occurred in association with this EGM. On the other hand, by determining that the received game theme data does not match any game themes previously identified by the user of the mobile device application as favorite game themes (or game themes the user wants to play), the mobile device application determines that no mobile device application EGM notification event occurred in association with this EGM.

In another example, the mobile device application enables a user to utilize the mobile device application to identify the parameters of one or more active bonuses and/or promotions available in association with the various EGMs at any given point in time. In this example, upon the mobile device application receiving data regarding the active bonuses and/or promotions available on any nearby EGMs (i.e., EGMs within a designated distance of the mobile device), the mobile device application filters out zero, one or more of the active bonuses and/or promotions based on the user's identified parameters, and then proceeds to determine whether an EGM notification event occurred in association with the remaining active bonuses and/or promotions.

In certain embodiments, the mobile device application EGM notification event occurs based on the received EGM state identifying data. That is, certain received EGM state identifying data is associated with an occurrence of a mobile device application EGM notification event that warrants notifying the user of the mobile device application about. For example, if the mobile device application receives data that an EGM is currently associated with an active bonus or promotion (i.e., EGM state identifying data of persistent promotional data), the mobile device application automatically determines that a mobile device application EGM notification event occurred in association with this EGM. On the other hand, if the mobile device application receives data that an EGM is not currently associated with an active bonus or promotion (i.e., EGM state identifying data of persistent promotional data), the mobile device application automatically determines that no mobile device application EGM notification event occurred in association with this EGM.

It should be appreciated that in different embodiments, the mobile device application EGM notification event occurs based on the EGM state identifying data and data obtained from zero, one or more other systems associated with a gaming establishment. In these embodiments, the system utilizes data from multiple different sources pertaining zero, one or more historical events which occurred (or did not occur) in association with the user of the mobile device to determine whether or not any notifications regarding any updates should be communicated to the user of the mobile device via the mobile device application.

In certain such embodiments, the different sources which provide data are associated with one or more gaming establishment locations, such as one or more different gaming establishments of the same gaming establishment brand. For example, to determine if an EGM is a new EGM (as it pertains to the user of the mobile device having not played that EGM or a similar EGM having the same game(s)), the system disclosed herein utilizes not only the EGM state identifying data (to determine the game(s) of the EGM), but also data obtained from a gaming establishment management system, such as a player tracking system associated with multiple different gaming establishment locations to determine if the user of the mobile device has ever logged in and/or earned player tracking points for playing that EGM or a similar EGM having the same game(s).

In certain such embodiments, the different sources which provide data are associated with a single gaming establishment. For example, to determine if an EGM (or a similar EGM having the same game(s)) was played by the user of the mobile device application during the user's last visit to a particular gaming establishment, the system disclosed herein utilizes not only the EGM state identifying data (to determine the game(s) of the EGM), but also data obtained from a gaming establishment cashless wagering system to determine if the user of the mobile device transferred funds from a cashless wagering account associated with that particular gaming establishment to that EGM (or a similar EGM having the same game(s)) during the user's last visit to that particular gaming establishment.

If the mobile device application determines that the data received from an EGM did not cause an EGM notification event to occur, then as indicated in block 108, the mobile device application does not display any notification regarding that EGM.

Figure 2A:
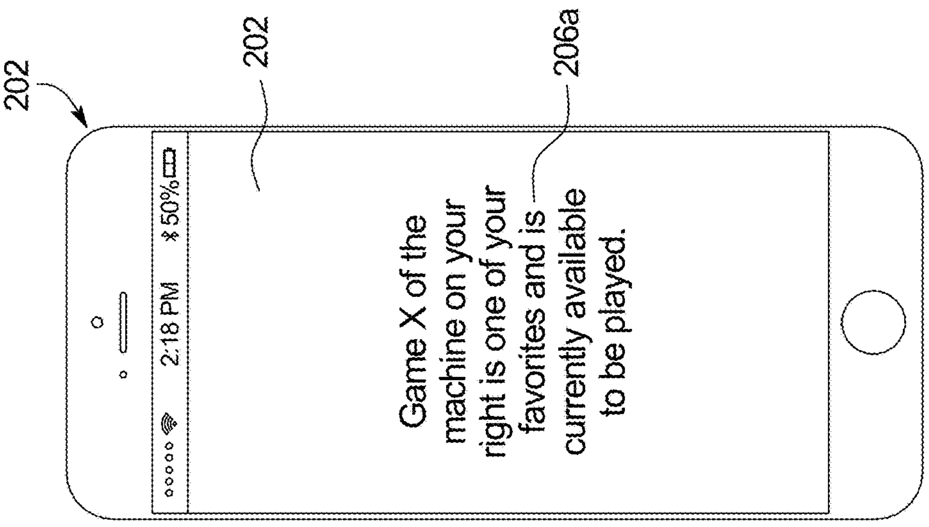
FIGS. 2A, 2B, and 2C are example graphical user interfaces displayed on a mobile device in connection with different mobile device application displayed notifications of the states of different electronic gaming machines.
Figure 2B:
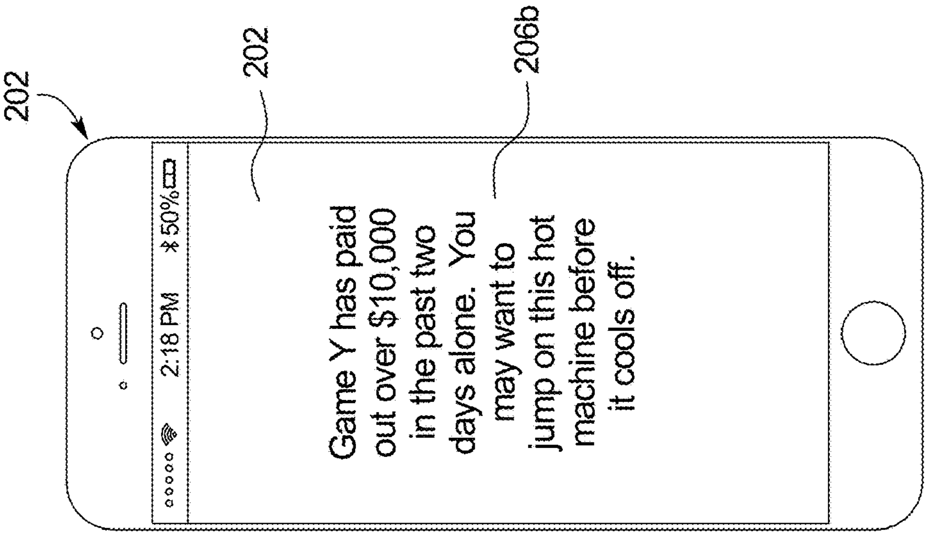

On the other hand, if the mobile device application determines that the data received from an EGM caused a mobile device application EGM notification event to occur, then as indicated in block 110, the mobile device application displays a notification regarding that EGM. That is, if the received EGM state identifying data warrants notifying the user of the mobile device application, then the mobile device application proceeds with causing the display device of the mobile device to display such notifications to the user. For example, as seen in FIG. 2A, if the mobile device application determines that the received data associated with a game theme of an EGM matches a game theme previously identified by the user of the mobile device application as a favorite game theme (i.e., an occurrence of a mobile device application EGM notification event), the mobile device application 202 of the mobile device 204 displays a notification to the user regarding the presence of an identified favorite game theme 206*a*. In another example, as seen in FIG. 2B, if the mobile device application determines that the received data associated with a duration since an EGM paid out an award over a designated value is within a designated duration (i.e., an occurrence of a mobile device application EGM notification event), the mobile device application 202 of the mobile device 204 displays a notification to the user regarding the presence of a "hot" EGM 206*b*.

Figure 2C:
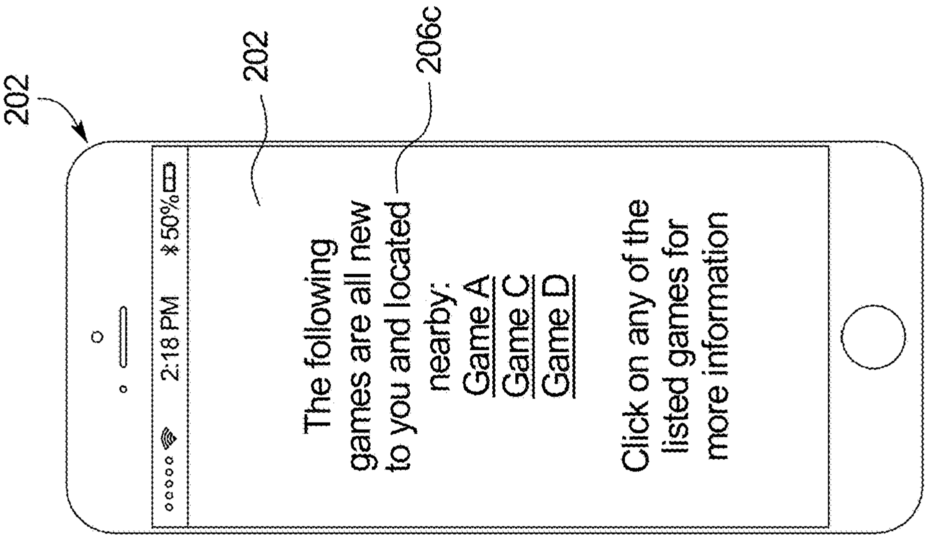
Figure 3:
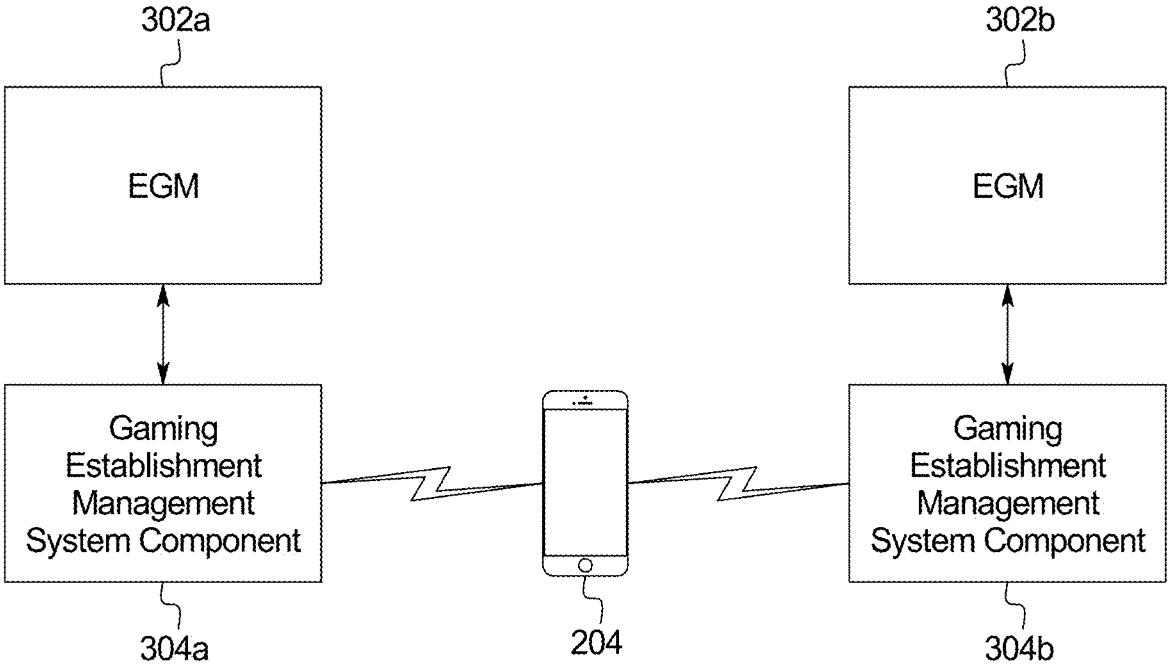
FIG. 3 is an example configuration of the architecture of a plurality of different components of the system disclosed herein.

In certain embodiments, the notification displayed by the mobile device application pertains to a particular EGM which the mobile device may or may not be paired with. For example, the mobile device application displays a notification that a specific EGM includes a new game theme which the user of the mobile device has not yet played. In certain embodiments, the notification displayed by the mobile device application pertains to a plurality of EGMs, certain of which the mobile device may or may not be paired with. For example, as seen in FIG. 3, if the mobile device 204 receives data from a plurality of EGMs 302 via the components of a gaming establishment management system 304, such as SMIBs, located within such EGMs, the mobile device application determines which of these EGMs are associated with new game themes which the user of the mobile device has not yet played and proceeds to display a listing of EGMs that each have a new game theme which the user of the mobile device has not yet played (as seen in the notification 206*c* of FIG. 2C). In this example, in addition to listing the new game theme, for one or more of such new games, the mobile device application displays one or more links to obtain promotional information regarding such new games.

In certain embodiments, the system enables each mobile device application to display one or more notifications pertaining to the state of one or more EGMs. In certain embodiments, the system enables certain qualifying mobile device applications to display one or more notifications pertaining to the state of one or more EGMs. In these embodiments, the system requires a user of a mobile device application to qualify to receive such notifications pertaining to the state of one or more EGMs. In different embodiments, a user of a mobile device application qualifies for such notifications based on any one or more of: a status of the user of the mobile device application (as determined via a gaming establishment management system, such as a player tracking system), historical gameplay of the user of the mobile device application, a location of use of the mobile device application (i.e., notifications are enabled in certain areas of a gaming establishment and disabled in other areas of the gaming establishment), and/or a fee paid by the user of the mobile device application.

In certain embodiments, the notification displayed by the mobile device application utilizes one or more augmented reality aspects to convey EGM state identifying information to the user of the mobile device. In certain such embodiments, the mobile device includes a camera and one or more geolocation modules, such as a global positioning system ("GPS") or other suitable navigation system associated with the mobile device, to determine a location of the mobile device by receiving GPS signal information for use in determining the position or location of the mobile device. In certain other embodiments, the mobile device includes a camera and one or more geolocation modules configured to receive multiple wireless signals from multiple remote devices (e.g., EGMs, servers, beacons wireless access points) and use the signal information to compute position/location information relating to the position or location of the mobile device. In these embodiments, when a player directs the camera to a designated location (which is determined via the geolocation modules), the camera captures an area of the designated location and reproduces that area on the display device of the mobile device. The mobile device application then overlays the notifications regarding one or more EGMs over the captured images from the camera such that the notifications are provided to the user of the mobile device while they view, via the mobile device camera, the particular EGM(s) which they are being notified about. Accordingly, the user of the mobile device can move or aim the camera of the mobile device at different areas and/or different locations and the mobile device dynamically updates the display device to reveal one or more notifications as the player moves the mobile device to target different areas. This dynamically updating configuration provides that the mobile device functions as a type of augmented reality device.

In certain other embodiments which utilize the location of the mobile device, following the determination of one or more EGM notification events occurring, the mobile display application displays a map or a radar with nearby EGMs of interest (i.e., EGMs associated with an EGM notification event occurring). In these embodiments, the mobile device application displays the relative distance to the EGM from the mobile device and the direction to the EGM from the mobile device (which is updated as the mobile device moves through the gaming establishment), wherein before or after the mobile device arriving at an EGM of interest, the mobile device application displays the determined notification to the user of the mobile device.

In certain embodiments, as mentioned above, rather than broadcasting the EGM state identifying data itself (and determining whether or not a mobile device application EGM notification event occurs based, at least in part, on the received EGM state identifying data), the EGM (or a component of a gaming establishment management system associated with the EGM) broadcasts in the available data field, such as the service data field, of the advertising packet one or more identifiers associated with the EGM state identifying data. In these embodiments, the data broadcasted by the EGM (or by component of a gaming establishment management system associated with the EGM) includes a unique EGM identifier associated with the wireless transceiver in that EGM. In such embodiments, the EGM (or component of the gaming establishment management system associated with the EGM) periodically reports the EGM state identifying data (such as the game data of the EGM, the historical gameplay data of the EGM, the persistent gameplay data of the EGM, the ongoing promotional data of the EGM, the historical promotional data of the EGM, the setting data of the EGM, the non-gameplay service data of the EGM and/or the historical placement data of the EGM) to one or more servers. The one or more servers of this embodiment associate the EGM state identifying data and the EGM identifier associated with the wireless transceiver in that EGM with a system identifier, such as a gaming establishment floor location or an asset number. The servers then utilize one or more databases to store such system identifiers, the associated EGM state identifying data and the EGM identifiers.

In operation of certain of these embodiments, upon the mobile device wirelessly receiving data of the EGM identifier associated with the wireless transceiver in that EGM, the mobile device application determines the relevant EGM state identifying data associated with the received EGM identifier associated with the wireless transceiver in that EGM. In one such embodiment, the mobile device application communicates the received EGM identifier associated with the wireless transceiver in that EGM to one or more servers which proceed to look up, in the maintained database, the system identifier and the EGM state identifying data associated with the received EGM identifier associated with the wireless transceiver in that EGM. In this embodiment, the one or more server then communicate to the mobile device application the determined system identifier and the EGM state identifying data associated with the received EGM identifier associated with the wireless transceiver in that EGM. Following receipt of the determined system identifier and the EGM state identifying data associated with the received EGM identifier associated with the wireless transceiver in that EGM, the mobile device application determines whether the received data causes an EGM notification to event to occur as described above.

For example, for each applicable EGM having a system identifier, such as floor location or asset number, the system disclosed herein records an EGM jackpot, an amount of the EGM jackpot, and an associated unique identifier for the BLE transceiver of that EGM (or of the gaming establishment management system component supported by that EGM). In this example, upon the mobile device application receiving the BLE transceiver identifier for nearby EGMs, the system (e.g., the mobile device application and/or one or more servers in communication with the mobile device application) looks-up the recent jackpots, and displays a notification regarding this information to the user of the mobile device application. In another example, for each applicable EGM having a system identifier, such as floor location or asset number, the system disclosed herein records the game theme of that EGM and an associated unique identifier for the BLE transceiver of that EGM (or of the gaming establishment management system component supported by that EGM). In this example, following the user of the mobile device making one or more mobile device application inputs to tag one or more game themes as favorite game themes and upon the mobile device application receiving the BLE transceiver identifier for nearby EGMs, the system (e.g., the mobile device application and/or one or more servers in communication with the mobile device application) looks-up the game themes of the nearby EGMs, compares the identified game themes of the nearby EGMs to the game themes tagged as favorites by the user of the mobile device and displays a notification utilizing the mobile device application if any of the game themes of the nearby EGMs matches any of the game themes tagged as favorites by the user of the mobile device. In another example, for each applicable EGM having a system identifier, such as floor location or asset number, the system disclosed herein sets any active bonuses and/or promotions associated with that EGM and an associated unique identifier for the BLE transceiver of that EGM (or of the gaming establishment management system component supported by that EGM). In this example, upon the mobile device application receiving the BLE transceiver identifier for nearby EGMs, the system (e.g., the mobile device application and/or one or more servers in communication with the mobile device application) looks-up the active bonuses and/or promotions associated with that EGM and displays a notification regarding this information to the user of the mobile device application.

In operation of certain other of these embodiments, upon activating, such as launching, the mobile device application, the one or more servers which maintain the system identifiers and the EGM state identifying data associated with one or more EGMs determine whether any EGM notification events occurred based on the data currently maintained in the database. In these embodiments, as the mobile device moves throughout the gaming establishment and receives data of the EGM identifiers associated with the wireless transceivers in different EGMs, the mobile device application displays zero, one or more notifications regarding such EGMs based on the determinations made by the one or more servers and communicated to the mobile device application.

It should be appreciated that while this illustrated example includes an EGM (functioning as a gaming establishment component) or a component of a gaming establishment management system supported by the EGM (functioning as a gaming establishment component) broadcasting EGM state identifying data, in different embodiments, any suitable gaming establishment component, such as a sports betting kiosk, a gaming terminal associated with a gaming table, and/or a retail point-of-sale terminal associated with the gaming establishment (or components of a gaming establishment management system supported by such devices) is configured to broadcast state identifying data associated with that gaming establishment component. In these embodiments, the state identifying data associated with that gaming establishment component would be reflective of one or more areas of interest (to the user of the mobile device) nearby the mobile device. For example, a retail point-of-sale terminal associated with the gaming establishment utilizes one or more available data fields to transmit data regarding an ongoing sale at a retail location wherein upon the mobile device application receiving the data, the mobile device application notifies the user of the mobile device regarding the ongoing sale. In another example, a display device having a wireless transceiver which is associated with a gaming establishment buffet utilizes one or more available data fields to transmit data regarding new items of the buffet. In one such example, upon the mobile device application receiving the data, the mobile device application notifies the user of the mobile device regarding the new items of the buffet. In another such example, upon the mobile device application receiving the data and determining, in association with data obtained from a gaming establishment management system, that the user of the mobile device is eligible for a complimentary buffet, the mobile device application notifies the user of the mobile device regarding the new items of the buffet as well as the user's complimentary buffet eligibility.

Accordingly, the system disclosed herein utilizes an application running on a mobile device to notify a user of the state of a gaming establishment component, such as an EGM, in wireless communication with the mobile device. In these embodiments, the mobile device application determines one or more states of one or more gaming establishment components and informs the user of such determined states to assist the user in determining which gaming establishment component(s) to engage and which gaming establishment component(s) not to engage. Such a mobile device application enhances a user's gaming experience by providing a real-time assessment of one or more gaming establishment components to more accurately reflect the state or status of different gaming establishment components, such as the gaming establishment components within a designated distance of the mobile device running the mobile device application.

Linking Mobile Device to EGM

In various embodiments, as indicated above, the system utilizes an EGM (or a component of a gaming establishment management system housed in the EGM) to communicate data between the mobile device and one or more components of the gaming establishment. In these embodiments, prior to enabling a user to take any action related to the gaming system and before, during and/or after notifying a user of the mobile device application any updates to any states or statues of such EGMs, a pairing or linkage occurs between the mobile device and the EGM via one or more applications being run or executed on the mobile device.

In certain embodiments, before, during and/or after notifying a user of the mobile device application any updates to the state or status of the EGM based on any received EGM state identifying data and after a user or player has opened an application on a mobile device and selected an action to be performed, the system determines if the mobile device application is associated with an active authorization token previously created by the system. In these embodiments, an authorization token is a time-based token which expires after a designated period of time and which is associated with an additional level of player authentication beyond a player's application username and application password.

If the system determines that the application is not associated with an active authorization token previously created by the system, the mobile device application prompts the player to provide identifying information, such as a personal identification number or biometric identifier. The mobile device application stores the provided identifying information as mobile device encrypted data. Following the player providing identifying information, the mobile device application prompts the player to cause the mobile device to engage the EGM (or a component of the EGM), such as prompting the player to tap the mobile device to a designated portion of the EGM. It should be appreciated that any reference herein to a player tapping the mobile device to a designated portion of the EGM (or a component of the EGM) may or may not include the player pressing a fingerprint scanner (if the mobile device is equipped with such a fingerprint scanner) while concurrently engaging the EGM (or a component of the EGM). In other embodiments, the mobile device application verifies the identifying information of the player by communicating with a verification/authentication server over one or more wireless communication protocols, such as WiFi protocol, a cellular communication protocol (e.g., 3G or LTE), to obtain the active authorization token.

In certain embodiments, following the user or player causing the mobile device to engage the EGM (e.g., the player taps the mobile device to a player tracking card reader or other designated location(s) of the EGM), the mobile device application communicates, via a wireless communication protocol, the provided identifying information and the requested action to be performed to the EGM (or to a component associated with the EGM). For example, upon the player tapping the mobile device to a player tracking card reader or other designated location(s) of the EGM (or otherwise moving the mobile device to within a designated distance of the player tracking card read or other designated locations(s) of the EGM), the mobile device application sends the identifying information and the requested action to a component of a gaming establishment management system located inside the EGM (i.e., a component of the EGM), such as a NexGen® player tracking component of an IGT Advantage® system. NexGen® and IGT Advantage® are trademarks of IGT, the Applicant of the present application.

Following the communication of the identifying information and the requested action to the EGM (or a component associated with the EGM), the system determines if the identifying information is valid. For example, a designated gaming establishment component configured to operate with a player tracking system determines whether the identifying information is valid.

If the system determines that the identifying information is invalid, the system communicates an invalid identifying information response to the mobile device. For example, an identifying information status message is communicated to the mobile device which reports whether the identifying information is valid or invalid. The mobile device application then displays one or more messages regarding the invalid identifying information and prompts the player to provide identifying information, such as a personal identification number or biometric identifier. In certain such embodiments, if the mobile device receives a communication that the identifying information is invalid (or alternatively in association with the initial creation of a token) and if the mobile device includes a fingerprint scanner, the mobile device application prompts the player to press the fingerprint scanner while engaging the EGM, such as tapping the mobile device to a designated portion of the EGM.

On the other hand, if the system determines that the identifying information is valid, the system creates an authorization token. The system associates the authorization token with a timestamp of when the authorization token will expire. In certain embodiments, a cashless system includes a key distribution center which generates a session key to encrypt all cashless messages. The session key is rotated periodically at a configurable rate from 1 hour to 24 hours.

In these embodiments, the system utilizes this session key to sign the token data and create a token. As such, the token time-to-live will be less than or equal to the session key rotation period. In other embodiments, such authorization tokens are managed utilizing software (and not a key distribution center).

In certain embodiments, the authorization token expires after a designated period of time as an additional level of security in the transfer of fund data to/from the EGM which is facilitated the mobile device. Such a designated amount of time which an authorization token remains valid enables the player to move from one EGM to another EGM and, utilize the mobile device application to access one or more services, without having to reprovide such identifying information each time the player switches EGMs. That is, the mobile device application disclosed herein is configured to communicate with one or more EGMs (without having to reauthenticate itself repeatedly) during the designated amount of time which the authorization token remains valid.

Following the creation of an authorization token, the system communicates the created authorization token to the mobile device, such as via one or more messages including the created authorization token, for storage by the mobile device application and proceeds with executing one or more of the requested actions selected via the mobile device application and communicating a requested action response to the mobile device. For example, upon the creation of the authorization token, the component of a gaming establishment management system located inside the EGM (i.e., a component of the EGM), such as a NexGen® player tracking component of an IGT Advantage® system, communicates the created authorization token to the mobile device and proceeds with executing the requested action.

On the other hand, following a determination that the mobile device application is associated with a previously created and stored authentication token, the mobile device application prompts the player to cause the mobile device to engage the EGM, such as prompting the player to tap the mobile device to a designated portion of the EGM.

Following the user or player causing the mobile device to engage the EGM (e.g., the player taps the mobile device to a player tracking card reader or other designated location(s) of the EGM), the mobile device application communicates, via a wireless communication protocol, the previously stored authorization token and the requested action selected via the mobile device application to be performed to the EGM (or to a component associated with the EGM). For example, upon the player tapping the mobile device to a player tracking card reader or other designated location(s) of the EGM, the mobile device application sends the stored authorization token and the requested action selected via the mobile device application to a component of a gaming establishment management system located inside the EGM (i.e., a component of the EGM), such as a NexGen® player tracking component of an IGT Advantage® system.

Following the communication of the stored authorization token and the requested action to the EGM or a component associated with the EGM, the system determines if the communicated authorization token is still valid. For example, a gaming establishment component configured to operate with a player tracking system determines whether the authorization token is valid (i.e., active and non-expired).

If the system determines that the communication authorization token is invalid, the system communicates an invalid authorization token response to the mobile device. The mobile device application then displays one or more messages regarding the invalid authorization token and prompts the player to provide identifying information, such as a personal identification number or biometric identifier, to obtain another authentication token.

On the other hand, if the system determines that the stored authorization token is valid, the system proceeds with executing the requested action accessed via the mobile device application. For example, upon the determination that the communicated authorization token is valid, the component of a gaming establishment management system located inside the EGM proceeds with executing the requested action and communicates a requested action response to the mobile device.

In certain embodiments, the system enables a player to interact with the EGM without having to continually reengage the EGM with the mobile device for each requested action. In these embodiments, after initially establishing a secure connection with the EGM, subsequent interactions between the mobile device application and the EGM occur without any subsequent physical interaction between the mobile device and the EGM. That is, to avoid having the player retrieve the mobile device and repeat the physical operation of engaging the EGM with the mobile device, certain embodiments enable the player to execute one or more functions without repeating the above-described physical operation of engaging the EGM with the mobile device. In certain such embodiments, the mobile device application utilizes one or more display devices of the EGM to display to the player information and/or player selectable prompts which are otherwise displayable via the display device of the mobile device.

In certain other embodiments, for each interaction or requested action between the EGM and the mobile device described herein, the system requires the player to reengage the EGM with the mobile device to reestablish or confirm the pairing between the EGM and the mobile device. In certain other embodiments, for each interaction between the EGM and the mobile device that occur a designated amount of time after the last engagement of the EGM with the mobile device, the system requires the player to reengage the EGM with the mobile device to reestablish or confirm the pairing between the EGM and the mobile device.

In various embodiments, after pairing the mobile device with the EGM (or a component of the EGM) and as described above, the mobile device application communicates one or more actions requested which are to be performed to the EGM.

Gaming Systems

The above-described embodiments of the present disclosure may be implemented in accordance with or in conjunction with one or more of a variety of different types of gaming systems, such as, but not limited to, those described below.

The present disclosure contemplates a variety of different gaming systems each having one or more of a plurality of different features, attributes, or characteristics. A "gaming system" as used herein refers to various configurations of: (a) one or more central servers, central controllers, or remote hosts; (b) one or more electronic gaming machines such as those located on a casino floor; and/or (c) one or more personal gaming devices, such as desktop computers, laptop computers, tablet computers or computing devices, personal digital assistants, mobile phones, and other mobile computing devices.

Thus, in various embodiments, the gaming system of the present disclosure includes: (a) one or more electronic gaming machines in combination with one or more central servers, central controllers, or remote hosts; (b) one or more personal gaming devices in combination with one or more central servers, central controllers, or remote hosts; (c) one or more personal gaming devices in combination with one or more electronic gaming machines; (d) one or more personal gaming devices, one or more electronic gaming machines, and one or more central servers, central controllers, or remote hosts in combination with one another; (e) a single electronic gaming machine; (f) a plurality of electronic gaming machines in combination with one another; (g) a single personal gaming device; (h) a plurality of personal gaming devices in combination with one another; (i) a single central server, central controller, or remote host; and/or (j) a plurality of central servers, central controllers, or remote hosts in combination with one another.

For brevity and clarity and unless specifically stated otherwise, the term "EGM" is used herein to refer to an electronic gaming machine (such as a slot machine, a video poker machine, a video lottery terminal (VLT), a video keno machine, or a video bingo machine located on a casino floor). Additionally, for brevity and clarity and unless specifically stated otherwise, "EGM" as used herein represents one EGM or a plurality of EGMs, "personal gaming device" as used herein represents one personal gaming device or a plurality of personal gaming devices, and "central server, central controller, or remote host" as used herein represents one central server, central controller, or remote host or a plurality of central servers, central controllers, or remote hosts.

As noted above, in various embodiments, the gaming system includes an EGM (or personal gaming device) in combination with a central server, central controller, or remote host. In such embodiments, the EGM (or personal gaming device) is configured to communicate with the central server, central controller, or remote host through a data network or remote communication link. In certain such embodiments, the EGM (or personal gaming device) is configured to communicate with another EGM (or personal gaming device) through the same data network or remote communication link or through a different data network or remote communication link.

In certain embodiments in which the gaming system includes an EGM (or personal gaming device) in combination with a central server, central controller, or remote host, the central server, central controller, or remote host is any suitable computing device (such as a server) that includes at least one processor and at least one memory device or data storage device. As further described herein, the EGM (or personal gaming device) includes at least one EGM (or personal gaming device) processor configured to transmit and receive data or signals representing events, messages, commands, or any other suitable information between the EGM (or personal gaming device) and the central server, central controller, or remote host. The at least one processor of that EGM (or personal gaming device) is configured to execute the events, messages, or commands represented by such data or signals in conjunction with the operation of the EGM (or personal gaming device). Moreover, the at least one processor of the central server, central controller, or remote host is configured to transmit and receive data or signals representing events, messages, commands, or any other suitable information between the central server, central controller, or remote host and the EGM (or personal gaming device). The at least one processor of the central server, central controller, or remote host is configured to execute the events, messages, or commands represented by such data or signals in conjunction with the operation of the central server, central controller, or remote host. One, more than one, or each of the functions of the central server, central controller, or remote host may be performed by the at least one processor of the EGM (or personal gaming device). Further, one, more than one, or each of the functions of the at least one processor of the EGM (or personal gaming device) may be performed by the at least one processor of the central server, central controller, or remote host.

In certain such embodiments, computerized instructions for controlling any games (such as any primary or base games and/or any secondary or bonus games) displayed by the EGM (or personal gaming device) are executed by the central server, central controller, or remote host. In such "thin client" embodiments, the central server, central controller, or remote host remotely controls any games (or other suitable interfaces) displayed by the EGM (or personal gaming device), and the EGM (or personal gaming device) is utilized to display such games (or suitable interfaces) and to receive one or more inputs or commands. In other such embodiments, computerized instructions for controlling any games displayed by the EGM (or personal gaming device) are communicated from the central server, central controller, or remote host to the EGM (or personal gaming device) and are stored in at least one memory device of the EGM (or personal gaming device). In such "thick client" embodiments, the at least one processor of the EGM (or personal gaming device) executes the computerized instructions to control any games (or other suitable interfaces) displayed by the EGM (or personal gaming device).

In various embodiments in which the gaming system includes a plurality of EGMs (or personal gaming devices), one or more of the EGMs (or personal gaming devices) are thin client EGMs (or personal gaming devices) and one or more of the EGMs (or personal gaming devices) are thick client EGMs (or personal gaming devices). In other embodiments in which the gaming system includes one or more EGMs (or personal gaming devices), certain functions of one or more of the EGMs (or personal gaming devices) are implemented in a thin client environment, and certain other functions of one or more of the EGMs (or personal gaming devices) are implemented in a thick client environment. In one such embodiment in which the gaming system includes an EGM (or personal gaming device) and a central server, central controller, or remote host, computerized instructions for controlling any primary or base games displayed by the EGM (or personal gaming device) are communicated from the central server, central controller, or remote host to the EGM (or personal gaming device) in a thick client configuration, and computerized instructions for controlling any secondary or bonus games or other functions displayed by the EGM (or personal gaming device) are executed by the central server, central controller, or remote host in a thin client configuration.

In certain embodiments in which the gaming system includes: (a) an EGM (or personal gaming device) configured to communicate with a central server, central controller, or remote host through a data network; and/or (b) a plurality of EGMs (or personal gaming devices) configured to communicate with one another through a data network, the data network is a local area network (LAN) in which the EGMs (or personal gaming devices) are located substantially proximate to one another and/or the central server, central controller, or remote host. In one example, the EGMs (or personal gaming devices) and the central server, central controller, or remote host are located in a gaming establishment or a portion of a gaming establishment.

In other embodiments in which the gaming system includes: (a) an EGM (or personal gaming device) configured to communicate with a central server, central controller, or remote host through a data network; and/or (b) a plurality of EGMs (or personal gaming devices) configured to communicate with one another through a data network, the data network is a wide area network (WAN) in which one or more of the EGMs (or personal gaming devices) are not necessarily located substantially proximate to another one of the EGMs (or personal gaming devices) and/or the central server, central controller, or remote host. For example, one or more of the EGMs (or personal gaming devices) are located: (a) in an area of a gaming establishment different from an area of the gaming establishment in which the central server, central controller, or remote host is located; or (b) in a gaming establishment different from the gaming establishment in which the central server, central controller, or remote host is located. In another example, the central server, central controller, or remote host is not located within a gaming establishment in which the EGMs (or personal gaming devices) are located. In certain embodiments in which the data network is a WAN, the gaming system includes a central server, central controller, or remote host and an EGM (or personal gaming device) each located in a different gaming establishment in a same geographic area, such as a same city or a same state. Gaming systems in which the data network is a WAN are substantially identical to gaming systems in which the data network is a LAN, though the quantity of EGMs (or personal gaming devices) in such gaming systems may vary relative to one another.

In further embodiments in which the gaming system includes: (a) an EGM (or personal gaming device) configured to communicate with a central server, central controller, or remote host through a data network; and/or (b) a plurality of EGMs (or personal gaming devices) configured to communicate with one another through a data network, the data network is an internet (such as the Internet) or an intranet. In certain such embodiments, an Internet browser of the EGM (or personal gaming device) is usable to access an Internet game page from any location where an Internet connection is available. In one such embodiment, after the EGM (or personal gaming device) accesses the Internet game page, the central server, central controller, or remote host identifies a player before enabling that player to place any wagers on any plays of any wagering games. In one example, the central server, central controller, or remote host identifies the player by requiring a player account of the player to be logged into via an input of a unique username and password combination assigned to the player. The central server, central controller, or remote host may, however, identify the player in any other suitable manner, such as by validating a player tracking identification number associated with the player; by reading a player tracking card or other smart card inserted into a card reader (as described below); by validating a unique player identification number associated with the player by the central server, central controller, or remote host; or by identifying the EGM (or personal gaming device), such as by identifying the MAC address or the IP address of the Internet facilitator. In various embodiments, once the central server, central controller, or remote host identifies the player, the central server, central controller, or remote host enables placement of one or more wagers on one or more plays of one or more primary or base games and/or one or more secondary or bonus games, and displays those plays via the Internet browser of the EGM (or personal gaming device). Examples of implementations of Internet-based gaming are further described in U.S. Pat. No. 8,764,566, entitled "Internet Remote Game Server," and U.S. Pat. No. 8,147,334, entitled "Universal Game Server".

The central server, central controller, or remote host and the EGM (or personal gaming device) are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile Internet network), or any other suitable medium. The expansion in the quantity of computing devices and the quantity and speed of Internet connections in recent years increases opportunities for players to use a variety of EGMs (or personal gaming devices) to play games from an ever-increasing quantity of remote sites. Additionally, the enhanced bandwidth of digital wireless communications may render such technology suitable for some or all communications, particularly if such communications are encrypted. Higher data transmission speeds may be useful for enhancing the sophistication and response of the display and interaction with players.

EGM Components

Figure 4:
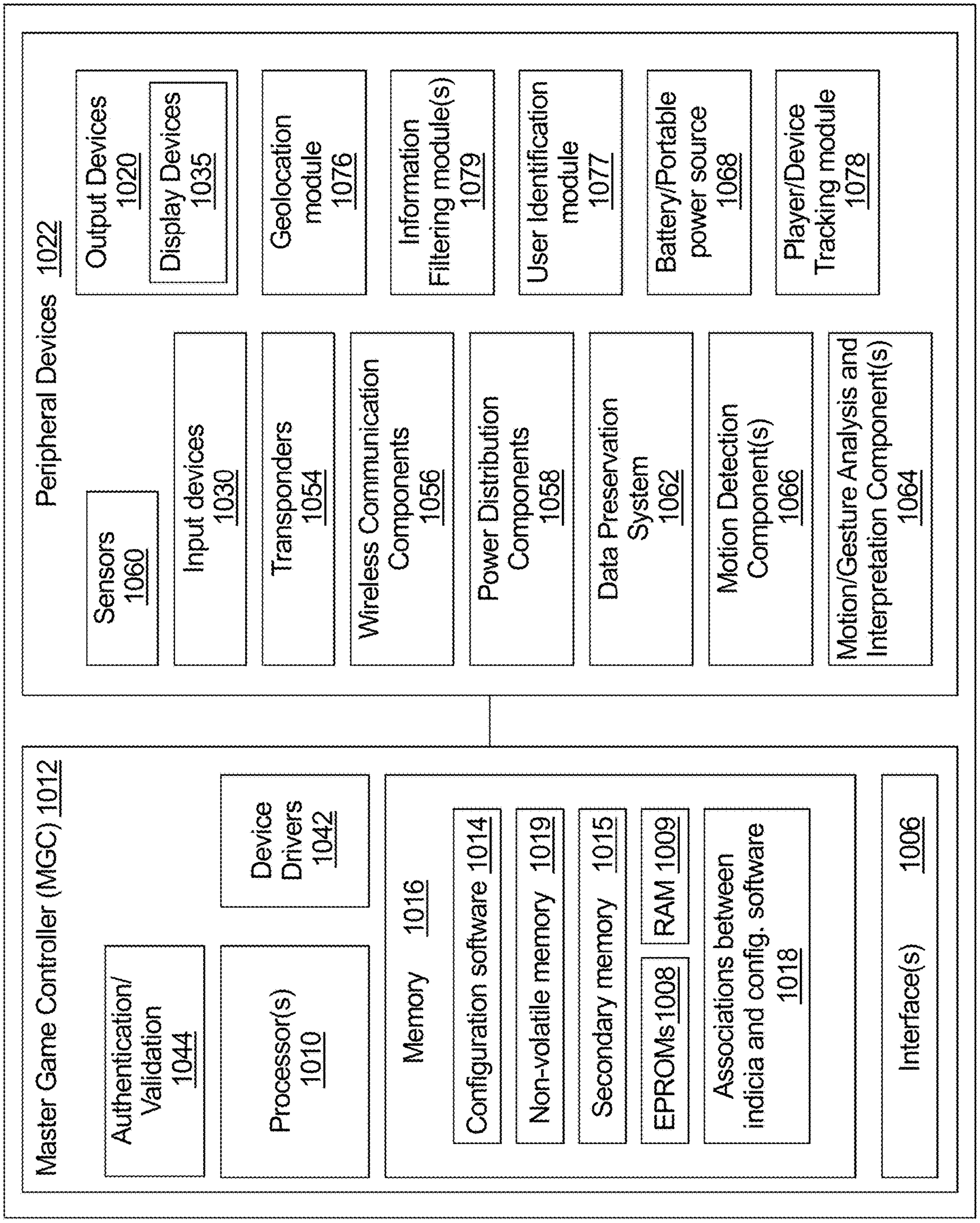
FIG. 4 is a schematic block diagram of one embodiment of an electronic configuration of an example gaming system disclosed herein.
Figure 5A:
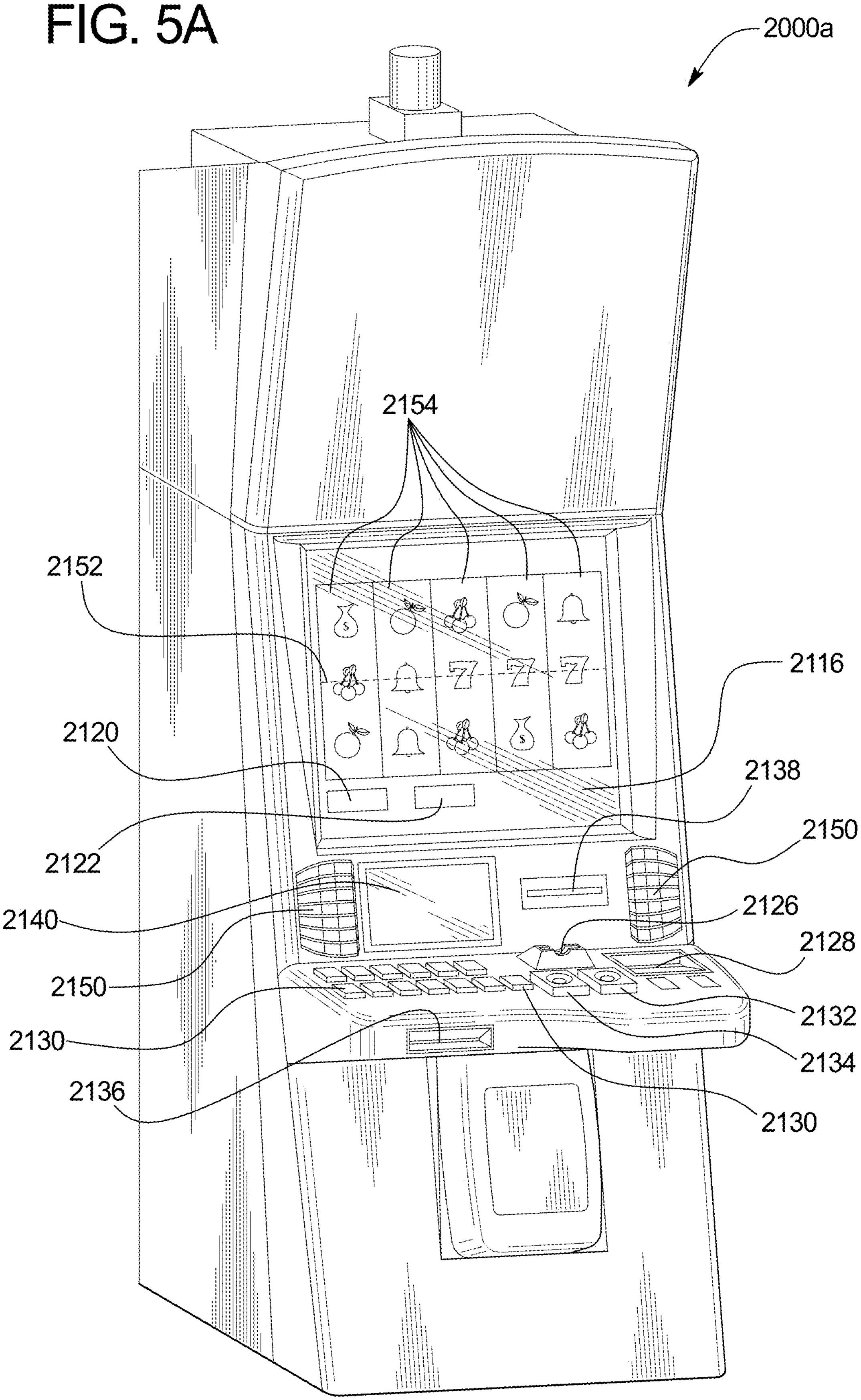
FIGS. 5A and 5B are perspective views of example alternative embodiments of the gaming system disclosed herein.
Figure 5B:
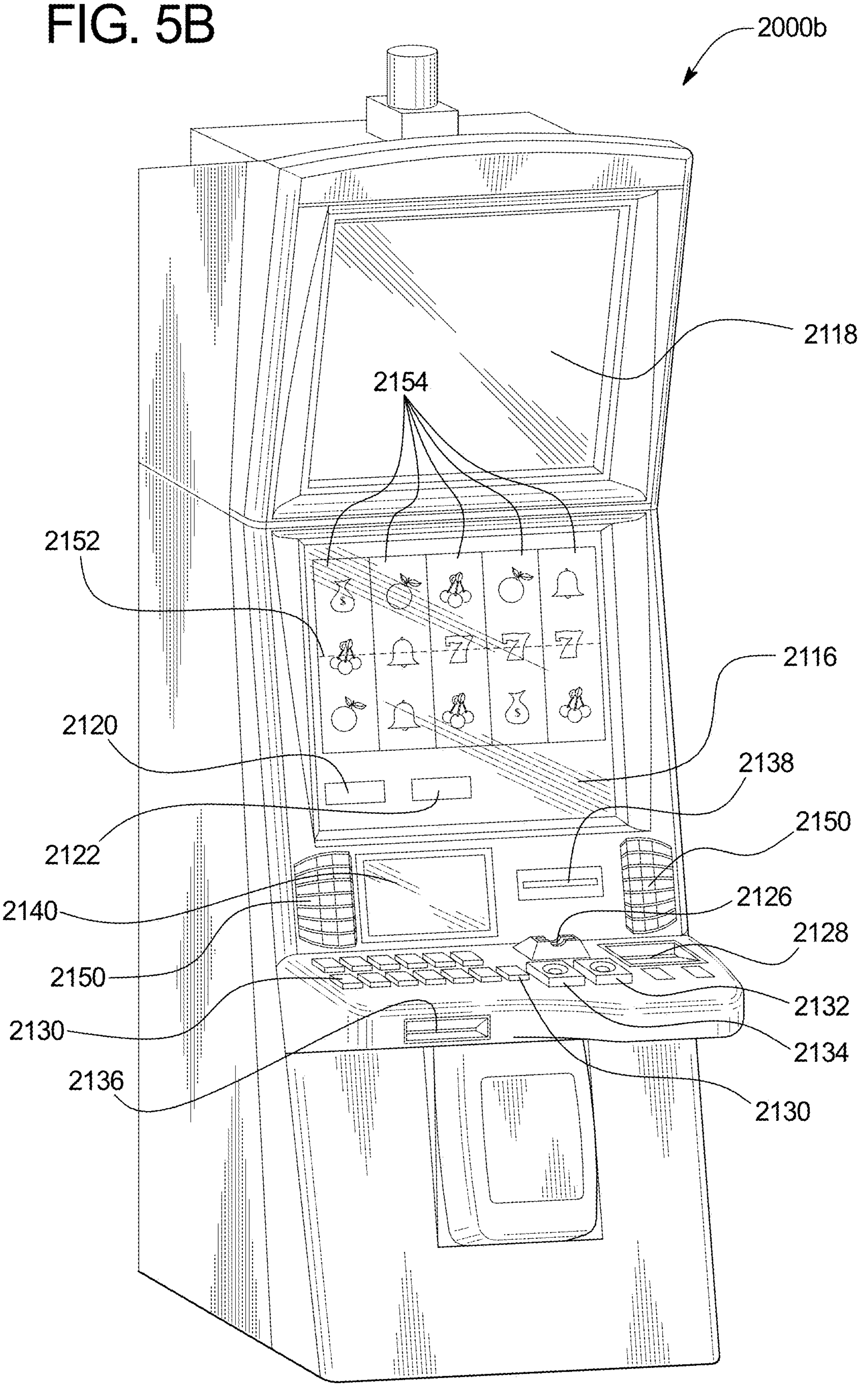

FIG. 4 is a block diagram of an example EGM 1000 and FIGS. 5A and 5B include two different example EGMs 2000*a* and 2000*b*. The EGMs 1000, 2000*a*, and 2000*b* are merely example EGMs, and different EGMs may be implemented using different combinations of the components shown in the EGMs 1000, 2000*a*, and 2000*b*. Although the below refers to EGMs, in various embodiments personal gaming devices may include some or all of the below components.

In these embodiments, the EGM 1000 includes a master gaming controller 1012 configured to communicate with and to operate with a plurality of peripheral devices 1022.

The master gaming controller 1012 includes at least one processor 1010. The at least one processor 1010 is any suitable processing device or set of processing devices, such as a microprocessor, a microcontroller-based platform, a suitable integrated circuit, or one or more application-specific integrated circuits (ASICs), configured to execute software enabling various configuration and reconfiguration tasks, such as: (1) communicating with a remote source (such as a server that stores authentication information or game information) via a communication interface 1006 of the master gaming controller 1012; (2) converting signals read by an interface to a format corresponding to that used by software or memory of the EGM; (3) accessing memory to configure or reconfigure game parameters in the memory according to indicia read from the EGM; (4) communicating with interfaces and the peripheral devices 1022 (such as input/output devices); and/or (5) controlling the peripheral devices 1022. In certain embodiments, one or more components of the master gaming controller 1012 (such as the at least one processor 1010) reside within a housing of the EGM (described below), while in other embodiments at least one component of the master gaming controller 1012 resides outside of the housing of the EGM.

The master gaming controller 1012 also includes at least one memory device 1016, which includes: (1) volatile memory (e.g., RAM 1009, which can include non-volatile RAM, magnetic RAM, ferroelectric RAM, and any other suitable forms); (2) non-volatile memory 1019 (e.g., disk memory, FLASH memory, EPROMs, EEPROMs, memristor-based non-volatile solid-state memory, etc.); (3) unalterable memory (e.g., EPROMs 1008); (4) read-only memory; and/or (5) a secondary memory storage device 1015, such as a non-volatile memory device, configured to store gaming software related information (the gaming software related information and the memory may be used to store various audio files and games not currently being used and invoked in a configuration or reconfiguration). Any other suitable magnetic, optical, and/or semiconductor memory may operate in conjunction with the EGM disclosed herein. In certain embodiments, the at least one memory device 1016 resides within the housing of the EGM (described below), while in other embodiments at least one component of the at least one memory device 1016 resides outside of the housing of the EGM.

The at least one memory device 1016 is configured to store, for example: (1) configuration software 1014, such as all the parameters and settings for a game playable on the EGM; (2) associations 1018 between configuration indicia read from an EGM with one or more parameters and settings; (3) communication protocols configured to enable the at least one processor 1010 to communicate with the peripheral devices 1022; and/or (4) communication transport protocols (such as TCP/IP, USB, Firewire, IEEE1394, Bluetooth, IEEE 802.11x (IEEE 802.11 standards), hiperlan/2, HomeRF, etc.) configured to enable the EGM to communicate with local and non-local devices using such protocols. In one implementation, the master gaming controller 1012 communicates with other devices using a serial communication protocol. A few non-limiting examples of serial communication protocols that other devices, such as peripherals (e.g., a bill validator or a ticket printer), may use to communicate with the master game controller 1012 include USB, RS-232, and Netplex (a proprietary protocol developed by IGT).

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Computer program code for carrying out operations for aspects of the present disclosure may be written in any combination of one or more programming languages, including an object oriented programming language such as Java, Scala, Smalltalk, Eiffel, JADE, Emerald, C++, C #, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

In certain embodiments, the at least one memory device 1016 is configured to store program code and instructions executable by the at least one processor of the EGM to control the EGM. The at least one memory device 1016 of the EGM also stores other operating data, such as image data, event data, input data, random number generators (RNGs) or pseudo-RNGs, paytable data or information, and/or applicable game rules that relate to the play of one or more games on the EGM. In various embodiments, part or all of the program code and/or the operating data described above is stored in at least one detachable or removable memory device including, but not limited to, a cartridge, a disk, a CD ROM, a DVD, a USB memory device, or any other suitable non-transitory computer readable medium. In certain such embodiments, an operator (such as a gaming establishment operator) and/or a player uses such a removable memory device in an EGM to implement at least part of the present disclosure. In other embodiments, part or all of the program code and/or the operating data is downloaded to the at least one memory device of the EGM through any suitable data network described above (such as an Internet or intranet).

The at least one memory device 1016 also stores a plurality of device drivers 1042. Examples of different types of device drivers include device drivers for EGM components and device drivers for the peripheral components 1022. Typically, the device drivers 1042 utilize various communication protocols that enable communication with a particular physical device. The device driver abstracts the hardware implementation of that device. For example, a device driver may be written for each type of card reader that could potentially be connected to the EGM. Non-limiting examples of communication protocols used to implement the device drivers include Netplex, USB, Serial, Ethernet 175, Firewire, I/O debouncer, direct memory map, serial, PCI, parallel, RF, Bluetooth™, near-field communications (e.g., using near-field magnetics), 802.11 (WiFi), etc. In one embodiment, when one type of a particular device is exchanged for another type of the particular device, the at least one processor of the EGM loads the new device driver from the at least one memory device to enable communication with the new device. For instance, one type of card reader in the EGM can be replaced with a second different type of card reader when device drivers for both card readers are stored in the at least one memory device.

In certain embodiments, the software units stored in the at least one memory device 1016 can be upgraded as needed. For instance, when the at least one memory device 1016 is a hard drive, new games, new game options, new parameters, new settings for existing parameters, new settings for new parameters, new device drivers, and new communication protocols can be uploaded to the at least one memory device 1016 from the master game controller 1012 or from some other external device. As another example, when the at least one memory device 1016 includes a CD/DVD drive including a CD/DVD configured to store game options, parameters, and settings, the software stored in the at least one memory device 1016 can be upgraded by replacing a first CD/DVD with a second CD/DVD. In yet another example, when the at least one memory device 1016 uses flash memory 1019 or EPROM 1008 units configured to store games, game options, parameters, and settings, the software stored in the flash and/or EPROM memory units can be upgraded by replacing one or more memory units with new memory units that include the upgraded software. In another embodiment, one or more of the memory devices, such as the hard drive, may be employed in a game software download process from a remote software server.

In some embodiments, the at least one memory device 1016 also stores authentication and/or validation components 1044 configured to authenticate/validate specified EGM components and/or information, such as hardware components, software components, firmware components, peripheral device components, user input device components, information received from one or more user input devices, information stored in the at least one memory device 1016, etc. Examples of various authentication and/or validation components are described in U.S. Pat. No. 6,620,047, entitled "Electronic Gaming Apparatus Having Authentication Data Sets".

In certain embodiments, the peripheral devices 1022 include several device interfaces, such as: (1) at least one output device 1020 including at least one display device 1035; (2) at least one input device 1030 (which may include contact and/or non-contact interfaces); (3) at least one transponder 1054; (4) at least one wireless communication component 1056; (5) at least one wired/wireless power distribution component 1058; (6) at least one sensor 1060; (7) at least one data preservation component 1062; (8) at least one motion/gesture analysis and interpretation component 1064; (9) at least one motion detection component 1066; (10) at least one portable power source 1068; (11) at least one geolocation module 1076; (12) at least one user identification module 1077; (13) at least one player/device tracking module 1078; and (14) at least one information filtering module 1079.

The at least one output device 1020 includes at least one display device 1035 configured to display any game(s) displayed by the EGM and any suitable information associated with such game(s). In certain embodiments, the display devices are connected to or mounted on a housing of the EGM (described below). In various embodiments, the display devices serve as digital glass configured to advertise certain games or other aspects of the gaming establishment in which the EGM is located. In various embodiments, the EGM includes one or more of the following display devices: (a) a central display device; (b) a player tracking display configured to display various information regarding a player's player tracking status (as described below); (c) a secondary or upper display device in addition to the central display device and the player tracking display; (d) a credit display configured to display a current quantity of credits, amount of cash, account balance, or the equivalent; and (e) a bet display configured to display an amount wagered for one or more plays of one or more games. The example EGM 2000*a* illustrated in FIG. 5A includes a central display device 2116, a player tracking display 2140, a credit display 2120, and a bet display 2122. The example EGM 2000*b* illustrated in FIG. 5B includes a central display device 2116, an upper display device 2118, a player tracking display 2140, a credit display 2120, and a bet display 2122.

In various embodiments, the display devices include, without limitation: a monitor, a television display, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display device includes a touch-screen with an associated touch-screen controller. The display devices may be of any suitable sizes, shapes, and configurations.

The display devices of the EGM are configured to display one or more game and/or non-game images, symbols, and indicia. In certain embodiments, the display devices of the EGM are configured to display any suitable visual representation or exhibition of the movement of objects; dynamic lighting; video images; images of people, characters, places, things, and faces of cards; and the like. In certain embodiments, the display devices of the EGM are configured to display one or more video reels, one or more video wheels, and/or one or more video dice. In other embodiments, certain of the displayed images, symbols, and indicia are in mechanical form. That is, in these embodiments, the display device includes any electromechanical device, such as one or more rotatable wheels, one or more reels, and/or one or more dice, configured to display at least one or a plurality of game or other suitable images, symbols, or indicia.

In various embodiments, the at least one output device 1020 includes a payout device. In these embodiments, after the EGM receives an actuation of a cashout device (described below), the EGM causes the payout device to provide a payment to the player. In one embodiment, the payout device is one or more of: (a) a ticket printer and dispenser configured to print and dispense a ticket or credit slip associated with a monetary value, wherein the ticket or credit slip may be redeemed for its monetary value via a cashier, a kiosk, or other suitable redemption system; (b) a bill dispenser configured to dispense paper currency; (c) a coin dispenser configured to dispense coins or tokens (such as into a coin payout tray); and (d) any suitable combination thereof. The example EGMs 2000*a* and 2000*b* illustrated in FIGS. 5A and 5B each include a ticket printer and dispenser 2136. Examples of ticket-in ticket-out (TITO) technology are described in U.S. Pat. No. 5,429,361, entitled "Gaming Machine Information, Communication and Display System"; U.S. Pat. No. 5,470,079, entitled "Gaming Machine Accounting and Monitoring System"; U.S. Pat. No. 5,265,874, entitled "Cashless Gaming Apparatus and Method"; U.S. Pat. No. 6,729,957, entitled "Gaming Method and Host Computer with Ticket-In/Ticket-Out Capability"; U.S. Pat. No. 6,729,958, entitled "Gaming System with Ticket-In/Ticket-Out Capability"; U.S. Pat. No. 6,736,725, entitled "Gaming Method and Host Computer with Ticket-In/Ticket-Out Capability"; U.S. Pat. No. 7,275,991, entitled "Slot Machine with Ticket-In/Ticket-Out Capability"; and U.S. Pat. No. 6,048,269, entitled "Coinless Slot Machine System and Method".

In certain embodiments, rather than dispensing bills, coins, or a physical ticket having a monetary value to the player following receipt of an actuation of the cashout device, the payout device is configured to cause a payment to be provided to the player in the form of an electronic funds transfer, such as via a direct deposit into a bank account, a casino account, or a prepaid account of the player; via a transfer of funds onto an electronically recordable identification card or smart card of the player; or via sending a virtual ticket having a monetary value to an electronic device of the player. Examples of providing payment using virtual tickets are described in U.S. Pat. No. 8,613,659, entitled "Virtual Ticket-In and Ticket-Out on a Gaming Machine".

While any credit balances, any wagers, any values, and any awards are described herein as amounts of monetary credits or currency, one or more of such credit balances, such wagers, such values, and such awards may be for non-monetary credits, promotional credits, of player tracking points or credits.

In certain embodiments, the at least one output device 1020 is a sound generating device controlled by one or more sound cards. In one such embodiment, the sound generating device includes one or more speakers or other sound generating hardware and/or software configured to generate sounds, such as by playing music for any games or by playing music for other modes of the EGM, such as an attract mode. The example EGMs 2000*a* and 2000*b* illustrated in FIGS. 5A and 5B each include a plurality of speakers 2150. In another such embodiment, the EGM provides dynamic sounds coupled with attractive multimedia images displayed on one or more of the display devices to provide an audio-visual representation or to otherwise display full-motion video with sound to attract players to the EGM. In certain embodiments, the EGM displays a sequence of audio and/or visual attraction messages during idle periods to attract potential players to the EGM. The videos may be customized to provide any appropriate information.

The at least one input device 1030 may include any suitable device that enables an input signal to be produced and received by the at least one processor 1010 of the EGM.

In one embodiment, the at least one input device 1030 includes a payment device configured to communicate with the at least one processor of the EGM to fund the EGM. In certain embodiments, the payment device includes one or more of: (a) a bill acceptor into which paper money is inserted to fund the EGM; (b) a ticket acceptor into which a ticket or a voucher is inserted to fund the EGM; (c) a coin slot into which coins or tokens are inserted to fund the EGM; (d) a reader or a validator for credit cards, debit cards, or credit slips into which a credit card, debit card, or credit slip is inserted to fund the EGM; (e) a player identification card reader into which a player identification card is inserted to fund the EGM; or (f) any suitable combination thereof. The example EGMs 2000*a* and 2000*b* illustrated in FIGS. 5A and 5B each include a combined bill and ticket acceptor 2128 and a coin slot 2126.

In one embodiment, the at least one input device 1030 includes a payment device configured to enable the EGM to be funded via an electronic funds transfer, such as a transfer of funds from a bank account. In another embodiment, the EGM includes a payment device configured to communicate with a mobile device of a player, such as a mobile phone, a radio frequency identification tag, or any other suitable wired or wireless device, to retrieve relevant information associated with that player to fund the EGM. Examples of funding an EGM via communication between the EGM and a mobile device (such as a mobile phone) of a player are described in U.S. Patent Application Publication No. 2013/0344942, entitled "Avatar as Security Measure for Mobile Device Use with Electronic Gaming Machine". When the EGM is funded, the at least one processor determines the amount of funds entered and displays the corresponding amount on a credit display or any other suitable display as described below.

In certain embodiments, the at least one input device 1030 includes at least one wagering or betting device. In various embodiments, the one or more wagering or betting devices are each: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). One such wagering or betting device is as a maximum wager or bet device that, when actuated, causes the EGM to place a maximum wager on a play of a game. Another such wagering or betting device is a repeat bet device that, when actuated, causes the EGM to place a wager that is equal to the previously-placed wager on a play of a game. A further such wagering or betting device is a bet one device that, when actuated, causes the EGM to increase the wager by one credit. Generally, upon actuation of one of the wagering or betting devices, the quantity of credits displayed in a credit meter (described below) decreases by the amount of credits wagered, while the quantity of credits displayed in a bet display (described below) increases by the amount of credits wagered.

In various embodiments, the at least one input device 1030 includes at least one game play activation device. In various embodiments, the one or more game play initiation devices are each: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). After a player appropriately funds the EGM and places a wager, the EGM activates the game play activation device to enable the player to actuate the game play activation device to initiate a play of a game on the EGM (or another suitable sequence of events associated with the EGM). After the EGM receives an actuation of the game play activation device, the EGM initiates the play of the game. The example EGMs 2000*a* and 2000*b* illustrated in FIGS. 5A and 5B each include a game play activation device in the form of a game play initiation button 2132. In other embodiments, the EGM begins game play automatically upon appropriate funding rather than upon utilization of the game play activation device.

In other embodiments, the at least one input device 1030 includes a cashout device. In various embodiments, the cashout device is: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). When the EGM receives an actuation of the cashout device from a player and the player has a positive (i.e., greater-than-zero) credit balance, the EGM initiates a payout associated with the player's credit balance. The example EGMs 2000*a* and 2000*b* illustrated in FIGS. 5A and 5B each include a cashout device in the form of a cashout button 2134.

In various embodiments, the at least one input device 1030 includes a plurality of buttons that are programmable by the EGM operator to, when actuated, cause the EGM to perform particular functions. For instance, such buttons may be hard keys, programmable soft keys, or icons icon displayed on a display device of the EGM (described below) that are actuatable via a touch screen of the EGM (described below) or via use of a suitable input device of the EGM (such as a mouse or a joystick). The example EGMs 2000*a* and 2000*b* illustrated in FIGS. 5A and 5B each include a plurality of such buttons 2130.

In certain embodiments, the at least one input device 1030 includes a touch-screen coupled to a touch-screen controller or other touch-sensitive display overlay to enable interaction with any images displayed on a display device (as described below). One such input device is a conventional touch-screen button panel. The touch-screen and the touch-screen controller are connected to a video controller. In these embodiments, signals are input to the EGM by touching the touch screen at the appropriate locations.

In embodiments including a player tracking system, as further described below, the at least one input device 1030 includes a card reader in communication with the at least one processor of the EGM. The example EGMs 2000*a* and 2000*b* illustrated in FIGS. 5A and 5B each include a card reader 2138. The card reader is configured to read a player identification card inserted into the card reader.

The at least one wireless communication component 1056 includes one or more communication interfaces having different architectures and utilizing a variety of protocols, such as (but not limited to) 802.11 (WiFi); 802.15 (including Bluetooth™); 802.16 (WiMax); 802.22; cellular standards such as CDMA, CDMA2000, and WCDMA; Radio Frequency (e.g., RFID); infrared; and Near Field Magnetic communication protocols. The at least one wireless communication component 1056 transmits electrical, electromagnetic, or optical signals that carry digital data streams or analog signals representing various types of information.

The at least one wired/wireless power distribution component 1058 includes components or devices that are configured to provide power to other devices. For example, in one embodiment, the at least one power distribution component 1058 includes a magnetic induction system that is configured to provide wireless power to one or more user input devices near the EGM. In one embodiment, a user input device docking region is provided, and includes a power distribution component that is configured to recharge a user input device without requiring metal-to-metal contact. In one embodiment, the at least one power distribution component 1058 is configured to distribute power to one or more internal components of the EGM, such as one or more rechargeable power sources (e.g., rechargeable batteries) located at the EGM.

In certain embodiments, the at least one sensor 1060 includes at least one of: optical sensors, pressure sensors, RF sensors, infrared sensors, image sensors, thermal sensors, and biometric sensors. The at least one sensor 1060 may be used for a variety of functions, such as: detecting movements and/or gestures of various objects within a predetermined proximity to the EGM; detecting the presence and/or identity of various persons (e.g., players, casino employees, etc.), devices (e.g., user input devices), and/or systems within a predetermined proximity to the EGM.

The at least one data preservation component 1062 is configured to detect or sense one or more events and/or conditions that, for example, may result in damage to the EGM and/or that may result in loss of information associated with the EGM. Additionally, the data preservation system 1062 may be operable to initiate one or more appropriate action(s) in response to the detection of such events/conditions.

The at least one motion/gesture analysis and interpretation component 1064 is configured to analyze and/or interpret information relating to detected player movements and/or gestures to determine appropriate player input information relating to the detected player movements and/or gestures. For example, in one embodiment, the at least one motion/gesture analysis and interpretation component 1064 is configured to perform one or more of the following functions: analyze the detected gross motion or gestures of a player; interpret the player's motion or gestures (e.g., in the context of a casino game being played) to identify instructions or input from the player; utilize the interpreted instructions/input to advance the game state; etc. In other embodiments, at least a portion of these additional functions may be implemented at a remote system or device.

The at least one portable power source 1068 enables the EGM to operate in a mobile environment. For example, in one embodiment, the EGM 300 includes one or more rechargeable batteries.

The at least one geolocation module 1076 is configured to acquire geolocation information from one or more remote sources and use the acquired geolocation information to determine information relating to a relative and/or absolute position of the EGM. For example, in one implementation, the at least one geolocation module 1076 is configured to receive GPS signal information for use in determining the position or location of the EGM. In another implementation, the at least one geolocation module 1076 is configured to receive multiple wireless signals from multiple remote devices (e.g., EGMs, servers, wireless access points, etc.) and use the signal information to compute position/location information relating to the position or location of the EGM.

The at least one user identification module 1077 is configured to determine the identity of the current user or current owner of the EGM. For example, in one embodiment, the current user is required to perform a login process at the EGM in order to access one or more features. Alternatively, the EGM is configured to automatically determine the identity of the current user based on one or more external signals, such as an RFID tag or badge worn by the current user and that provides a wireless signal to the EGM that is used to determine the identity of the current user. In at least one embodiment, various security features are incorporated into the EGM to prevent unauthorized users from accessing confidential or sensitive information.

The at least one information filtering module 1079 is configured to perform filtering (e.g., based on specified criteria) of selected information to be displayed at one or more displays 1035 of the EGM.

In various embodiments, the EGM includes a plurality of communication ports configured to enable the at least one processor of the EGM to communicate with and to operate with external peripherals, such as: accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumbsticks, ticket readers, touch screens, trackballs, touchpads, wheels, and wireless communication devices. U.S. Pat. No. 7,290,072 describes a variety of EGMs including one or more communication ports that enable the EGMs to communicate and operate with one or more external peripherals.

As generally described above, in certain embodiments, such as the example EGMs 2000*a* and 2000*b* illustrated in FIGS. 5A and 5B, the EGM has a support structure, housing, or cabinet that provides support for a plurality of the input devices and the output devices of the EGM. Further, the EGM is configured such that a player may operate it while standing or sitting. In various embodiments, the EGM is positioned on a base or stand, or is configured as a pub-style tabletop game (not shown) that a player may operate typically while sitting. As illustrated by the different example EGMs 2000*a* and 2000*b* shown in FIGS. 5A and 5B, EGMs may have varying housing and display configurations.

In certain embodiments, the EGM is a device that has obtained approval from a regulatory gaming commission, and in other embodiments, the EGM is a device that has not obtained approval from a regulatory gaming commission.

The EGMs described above are merely three examples of different types of EGMs. Certain of these example EGMs may include one or more elements that may not be included in all gaming systems, and these example EGMs may not include one or more elements that are included in other gaming systems. For example, certain EGMs include a coin acceptor while others do not.

Operation of Primary or Base Games and/or Secondary or Bonus Games

In various embodiments, an EGM may be implemented in one of a variety of different configurations. In various embodiments, the EGM may be implemented as one of: (a) a dedicated EGM in which computerized game programs executable by the EGM for controlling any primary or base games (referred to herein as "primary games") and/or any secondary or bonus games or other functions (referred to herein as "secondary games") displayed by the EGM are provided with the EGM before delivery to a gaming establishment or before being provided to a player; and (b) a changeable EGM in which computerized game programs executable by the EGM for controlling any primary games and/or secondary games displayed by the EGM are downloadable or otherwise transferred to the EGM through a data network or remote communication link; from a USB drive, flash memory card, or other suitable memory device; or in any other suitable manner after the EGM is physically located in a gaming establishment or after the EGM is provided to a player.

As generally explained above, in various embodiments in which the gaming system includes a central server, central controller, or remote host and a changeable EGM, the at least one memory device of the central server, central controller, or remote host stores different game programs and instructions executable by the at least one processor of the changeable EGM to control one or more primary games and/or secondary games displayed by the changeable EGM. More specifically, each such executable game program represents a different game or a different type of game that the at least one changeable EGM is configured to operate. In one example, certain of the game programs are executable by the changeable EGM to operate games having the same or substantially the same game play but different paytables. In different embodiments, each executable game program is associated with a primary game, a secondary game, or both. In certain embodiments, an executable game program is executable by the at least one processor of the at least one changeable EGM as a secondary game to be played simultaneously with a play of a primary game (which may be downloaded to or otherwise stored on the at least one changeable EGM), or vice versa.

In operation of such embodiments, the central server, central controller, or remote host is configured to communicate one or more of the stored executable game programs to the at least one processor of the changeable EGM. In different embodiments, a stored executable game program is communicated or delivered to the at least one processor of the changeable EGM by: (a) embedding the executable game program in a device or a component (such as a microchip to be inserted into the changeable EGM); (b) writing the executable game program onto a disc or other media; or (c) uploading or streaming the executable game program over a data network (such as a dedicated data network). After the executable game program is communicated from the central server, central controller, or remote host to the changeable EGM, the at least one processor of the changeable EGM executes the executable game program to enable the primary game and/or the secondary game associated with that executable game program to be played using the display device(s) and/or the input device(s) of the changeable EGM. That is, when an executable game program is communicated to the at least one processor of the changeable EGM, the at least one processor of the changeable EGM changes the game or the type of game that may be played using the changeable EGM.

In certain embodiments, the gaming system randomly determines any game outcome(s) (such as a win outcome) and/or award(s) (such as a quantity of credits to award for the win outcome) for a play of a primary game and/or a play of a secondary game based on probability data. In certain such embodiments, this random determination is provided through utilization of an RNG, such as a true RNG or a pseudo RNG, or any other suitable randomization process. In one such embodiment, each game outcome or award is associated with a probability, and the gaming system generates the game outcome(s) and/or the award(s) to be provided based on the associated probabilities. In these embodiments, since the gaming system generates game outcomes and/or awards randomly or based on one or more probability calculations, there is no certainty that the gaming system will ever provide any specific game outcome and/or award.

In certain embodiments, the gaming system maintains one or more predetermined pools or sets of predetermined game outcomes and/or awards. In certain such embodiments, upon generation or receipt of a game outcome and/or award request, the gaming system independently selects one of the predetermined game outcomes and/or awards from the one or more pools or sets. The gaming system flags or marks the selected game outcome and/or award as used. Once a game outcome or an award is flagged as used, it is prevented from further selection from its respective pool or set; that is, the gaming system does not select that game outcome or award upon another game outcome and/or award request. The gaming system provides the selected game outcome and/or award. Examples of this type of award evaluation are described in U.S. Pat. No. 7,470,183, entitled "Finite Pool Gaming Method and Apparatus"; U.S. Pat. No. 7,563,163, entitled "Gaming Device Including Outcome Pools for Providing Game Outcomes"; U.S. Pat. No. 7,833,092, entitled "Method and System for Compensating for Player Choice in a Game of Chance"; U.S. Pat. No. 8,070,579, entitled "Bingo System with Downloadable Common Patterns"; and U.S. Pat. No. 8,398,472, entitled "Central Determination Poker Game".

In certain embodiments, the gaming system determines a predetermined game outcome and/or award based on the results of a bingo, keno, or lottery game. In certain such embodiments, the gaming system utilizes one or more bingo, keno, or lottery games to determine the predetermined game outcome and/or award provided for a primary game and/or a secondary game. The gaming system is provided or associated with a bingo card. Each bingo card consists of a matrix or array of elements, wherein each element is designated with separate indicia. After a bingo card is provided, the gaming system randomly selects or draws a plurality of the elements. As each element is selected, a determination is made as to whether the selected element is present on the bingo card. If the selected element is present on the bingo card, that selected element on the provided bingo card is marked or flagged. This process of selecting elements and marking any selected elements on the provided bingo cards continues until one or more predetermined patterns are marked on one or more of the provided bingo cards. After one or more predetermined patterns are marked on one or more of the provided bingo cards, game outcome and/or award is determined based, at least in part, on the selected elements on the provided bingo cards. Examples of this type of award determination are described in U.S. Pat. No. 7,753,774, entitled "Using Multiple Bingo Cards to Represent Multiple Slot Paylines and Other Class III Game Options"; U.S. Pat. No. 7,731,581, entitled "Multi-Player Bingo Game with Multiple Alternative Outcome Displays"; U.S. Pat. No. 7,955,170, entitled "Providing Non-Bingo Outcomes for a Bingo Game"; U.S. Pat. No. 8,070,579, entitled "Bingo System with Downloadable Common Patterns"; and U.S. Pat. No. 8,500,538, entitled "Bingo Gaming System and Method for Providing Multiple Outcomes from Single Bingo Pattern".

In certain embodiments in which the gaming system includes a central server, central controller, or remote host and an EGM, the EGM is configured to communicate with the central server, central controller, or remote host for monitoring purposes only. In such embodiments, the EGM determines the game outcome(s) and/or award(s) to be provided in any of the manners described above, and the central server, central controller, or remote host monitors the activities and events occurring on the EGM. In one such embodiment, the gaming system includes a real-time or online accounting and gaming information system configured to communicate with the central server, central controller, or remote host. In this embodiment, the accounting and gaming information system includes: (a) a player database configured to store player profiles, (b) a player tracking module configured to track players (as described below), and (c) a credit system configured to provide automated transactions. Examples of such accounting systems are described in U.S. Pat. No. 6,913,534, entitled "Gaming Machine Having a Lottery Game and Capability for Integration with Gaming Device Accounting System and Player Tracking System," and U.S. Pat. No. 8,597,116, entitled "Virtual Player Tracking and Related Services".

As noted above, in various embodiments, the gaming system includes one or more executable game programs executable by at least one processor of the gaming system to provide one or more primary games and one or more secondary games. The primary game(s) and the secondary game(s) may comprise any suitable games and/or wagering games, such as, but not limited to: electro-mechanical or video slot or spinning reel type games; video card games such as video draw poker, multi-hand video draw poker, other video poker games, video blackjack games, and video baccarat games; video keno games; video bingo games; and video selection games.

In certain embodiments in which the primary game is a slot or spinning reel type game, the gaming system includes one or more reels in either an electromechanical form with mechanical rotating reels or in a video form with simulated reels and movement thereof. Each reel displays a plurality of indicia or symbols, such as bells, hearts, fruits, numbers, letters, bars, or other images that typically correspond to a theme associated with the gaming system. In certain such embodiments, the gaming system includes one or more paylines associated with the reels. The example EGM **2000*b* shown in FIG. 5B includes a payline 1152 and a plurality of reels 1154**. In certain embodiments, one or more of the reels are independent reels or unisymbol reels. In such embodiments, each independent reel generates and displays one symbol.

In various embodiments, one or more of the paylines is horizontal, vertical, circular, diagonal, angled, or any suitable combination thereof. In other embodiments, each of one or more of the paylines is associated with a plurality of adjacent symbol display areas on a requisite number of adjacent reels. In one such embodiment, one or more paylines are formed between at least two symbol display areas that are adjacent to each other by either sharing a common side or sharing a common corner (i.e., such paylines are connected paylines). The gaming system enables a wager to be placed on one or more of such paylines to activate such paylines. In other embodiments in which one or more paylines are formed between at least two adjacent symbol display areas, the gaming system enables a wager to be placed on a plurality of symbol display areas, which activates those symbol display areas.

In various embodiments, the gaming system provides one or more awards after a spin of the reels when specified types and/or configurations of the indicia or symbols on the reels occur on an active payline or otherwise occur in a winning pattern, occur on the requisite number of adjacent reels, and/or occur in a scatter pay arrangement.

In certain embodiments, the gaming system employs a ways to win award determination. In these embodiments, any outcome to be provided is determined based on a number of associated symbols that are generated in active symbol display areas on the requisite number of adjacent reels (i.e., not on paylines passing through any displayed winning symbol combinations). If a winning symbol combination is generated on the reels, one award for that occurrence of the generated winning symbol combination is provided. Examples of ways to win award determinations are described in U.S. Pat. No. 8,012,011, entitled "Gaming Device and Method Having Independent Reels and Multiple Ways of Winning"; U.S. Pat. No. 8,241,104, entitled "Gaming Device and Method Having Designated Rules for Determining Ways To Win"; and U.S. Pat. No. 8,430,739, entitled "Gaming System and Method Having Wager Dependent Different Symbol Evaluations".

In various embodiments, the gaming system includes a progressive award. Typically, a progressive award includes an initial amount and an additional amount funded through a portion of each wager placed to initiate a play of a primary game. When one or more triggering events occurs, the gaming system provides at least a portion of the progressive award. After the gaming system provides the progressive award, an amount of the progressive award is reset to the initial amount and a portion of each subsequent wager is allocated to the next progressive award. Examples of progressive gaming systems are described in U.S. Pat. No. 7,585,223, entitled "Server Based Gaming System Having Multiple Progressive Awards"; U.S. Pat. No. 7,651,392, entitled "Gaming Device System Having Partial Progressive Payout"; U.S. Pat. No. 7,666,093, entitled "Gaming Method and Device Involving Progressive Wagers"; U.S. Pat. No. 7,780,523, entitled "Server Based Gaming System Having Multiple Progressive Awards"; and U.S. Pat. No. 8,337,298, entitled "Gaming Device Having Multiple Different Types of Progressive Awards".

As generally noted above, in addition to providing winning credits or other awards for one or more plays of the primary game(s), in various embodiments the gaming system provides credits or other awards for one or more plays of one or more secondary games. The secondary game typically enables an award to be obtained addition to any award obtained through play of the primary game(s). The secondary game(s) typically produces a higher level of player excitement than the primary game(s) because the secondary game(s) provides a greater expectation of winning than the primary game(s) and is accompanied with more attractive or unusual features than the primary game (s). The secondary game(s) may be any type of suitable game, either similar to or completely different from the primary game.

In various embodiments, the gaming system automatically provides or initiates the secondary game upon the occurrence of a triggering event or the satisfaction of a qualifying condition. In other embodiments, the gaming system initiates the secondary game upon the occurrence of the triggering event or the satisfaction of the qualifying condition and upon receipt of an initiation input. In certain embodiments, the triggering event or qualifying condition is a selected outcome in the primary game(s) or a particular arrangement of one or more indicia on a display device for a play of the primary game(s), such as a "BONUS" symbol appearing on three adjacent reels along a payline following a spin of the reels for a play of the primary game. In other embodiments, the triggering event or qualifying condition occurs based on a certain amount of game play (such as number of games, number of credits, amount of time) being exceeded, or based on a specified number of points being earned during game play. Any suitable triggering event or qualifying condition or any suitable combination of a plurality of different triggering events or qualifying conditions may be employed.

In other embodiments, at least one processor of the gaming system randomly determines when to provide one or more plays of one or more secondary games. In one such embodiment, no apparent reason is provided for providing the secondary game. In this embodiment, qualifying for a secondary game is not triggered by the occurrence of an event in any primary game or based specifically on any of the plays of any primary game. That is, qualification is provided without any explanation or, alternatively, with a simple explanation. In another such embodiment, the gaming system determines qualification for a secondary game at least partially based on a game triggered or symbol triggered event, such as at least partially based on play of a primary game.

In various embodiments, after qualification for a secondary game has been determined, the secondary game participation may be enhanced through continued play on the primary game. Thus, in certain embodiments, for each secondary game qualifying event, such as a secondary game symbol, that is obtained, a given number of secondary game wagering points or credits is accumulated in a "secondary game meter" configured to accrue the secondary game wagering credits or entries toward eventual participation in the secondary game. In one such embodiment, the occurrence of multiple such secondary game qualifying events in the primary game results in an arithmetic or exponential increase in the number of secondary game wagering credits awarded. In another such embodiment, any extra secondary game wagering credits may be redeemed during the secondary game to extend play of the secondary game.

In certain embodiments, no separate entry fee or buy-in for the secondary game is required. That is, entry into the secondary game cannot be purchased; rather, in these embodiments entry must be won or earned through play of the primary game, thereby encouraging play of the primary game. In other embodiments, qualification for the secondary game is accomplished through a simple "buy-in." For example, qualification through other specified activities is unsuccessful, payment of a fee or placement of an additional wager "buys-in" to the secondary game. In certain embodiments, a separate side wager must be placed on the secondary game or a wager of a designated amount must be placed on the primary game to enable qualification for the secondary game. In these embodiments, the secondary game triggering event must occur and the side wager (or designated primary game wager amount) must have been placed for the secondary game to trigger.

In various embodiments in which the gaming system includes a plurality of EGMs, the EGMs are configured to communicate with one another to provide a group gaming environment. In certain such embodiments, the EGMs enable players of those EGMs to work in conjunction with one another, such as by enabling the players to play together as a team or group, to win one or more awards. In other such embodiments, the EGMs enable players of those EGMs to compete against one another for one or more awards. In one such embodiment, the EGMs enable the players of those EGMs to participate in one or more gaming tournaments for one or more awards. Examples of group gaming systems are described in U.S. Pat. No. 8,070,583, entitled "Server Based Gaming System and Method for Selectively Providing One or More Different Tournaments"; U.S. Pat. No. 8,500,548, entitled "Gaming System and Method for Providing Team Progressive Awards"; and U.S. Pat. No. 8,562,423, entitled "Method and Apparatus for Rewarding Multiple Game Players for a Single Win".

In various embodiments, the gaming system includes one or more player tracking systems. Such player tracking systems enable operators of the gaming system (such as casinos or other gaming establishments) to recognize the value of customer loyalty by identifying frequent customers and rewarding them for their patronage. Such a player tracking system is configured to track a player's gaming activity. In one such embodiment, the player tracking system does so through the use of player tracking cards. In this embodiment, a player is issued a player identification card that has an encoded player identification number that uniquely identifies the player. When the player's playing tracking card is inserted into a card reader of the gaming system to begin a gaming session, the card reader reads the player identification number off the player tracking card to identify the player. The gaming system timely tracks any suitable information or data relating to the identified player's gaming session. The gaming system also timely tracks when the player tracking card is removed to conclude play for that gaming session. In another embodiment, rather than requiring insertion of a player tracking card into the card reader, the gaming system utilizes one or more portable devices, such as a mobile phone, a radio frequency identification tag, or any other suitable wireless device, to track when a gaming session begins and ends. In another embodiment, the gaming system utilizes any suitable biometric technology or ticket technology to track when a gaming session begins and ends.

In such embodiments, during one or more gaming sessions, the gaming system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In various embodiments, such tracked information and/or any suitable feature associated with the player tracking system is displayed on a player tracking display. In various embodiments, such tracked information and/or any suitable feature associated with the player tracking system is displayed via one or more service windows that are displayed on the central display device and/or the upper display device. Examples of player tracking systems are described in U.S. Pat. No. 6,722,985, entitled "Universal Player Tracking System"; U.S. Pat. No. 6,908,387, entitled "Player Tracking Communication Mechanisms in a Gaming Machine"; U.S. Pat. No. 7,311,605, entitled "Player Tracking Assembly for Complete Patron Tracking for Both Gaming and Non-Gaming Casino Activity"; U.S. Pat. No. 7,611,411, entitled "Player Tracking Instruments Having Multiple Communication Modes"; U.S. Pat. No. 7,617,151, entitled "Alternative Player Tracking Techniques"; and U.S. Pat. No. 8,057,298, entitled "Virtual Player Tracking and Related Services".

Web-Based Gaming

In various embodiments, the gaming system includes one or more servers configured to communicate with a personal gaming device—such as a smartphone, a tablet computer, a desktop computer, or a laptop computer—to enable web-based game play using the personal gaming device. In various embodiments, the player must first access a gaming website via an Internet browser of the personal gaming device or execute an application (commonly called an "app") installed on the personal gaming device before the player can use the personal gaming device to participate in web-based game play. In certain embodiments, the one or more servers and the personal gaming device operate in a thin-client environment. In these embodiments, the personal gaming device receives inputs via one or more input devices (such as a touch screen and/or physical buttons), the personal gaming device sends the received inputs to the one or more servers, the one or more servers make various determinations based on the inputs and determine content to be displayed (such as a randomly determined game outcome and corresponding award), the one or more servers send the content to the personal gaming device, and the personal gaming device displays the content.

In certain such embodiments, the one or more servers must identify the player before enabling game play on the personal gaming device (or, in some embodiments, before enabling monetary wager-based game play on the personal gaming device). In these embodiments, the player must identify herself to the one or more servers, such as by inputting the player's unique username and password combination (or in any other manners described above.

Once identified, the one or more servers enable the player to establish an account balance from which the player can draw credits usable to wager on plays of a game. In certain embodiments, the one or more servers enable the player to initiate an electronic funds transfer to transfer funds from a bank account to the player's account balance. In other embodiments, the one or more servers enable the player to make a payment using the player's credit card, debit card, or other suitable device to add money to the player's account balance. In other embodiments, the one or more servers enable the player to add money to the player's account balance via a peer-to-peer type application, such as PayPal or Venmo. The one or more servers also enable the player to cash out the player's account balance (or part of it) in any suitable manner, such as via an electronic funds transfer or by initiating creation of a paper check that is mailed to the player.

In certain embodiments, the one or more servers include a payment server that handles establishing and cashing out players' account balances and a separate game server configured to determine the outcome and any associated award for a play of a game. In these embodiments, the game server is configured to communicate with the personal gaming device and the payment device, and the personal gaming device and the payment device are not configured to directly communicate with one another. In these embodiments, when the game server receives data representing a request to start a play of a game at a desired wager, the game server sends data representing the desired wager to the payment server. The payment server determines whether the player's account balance can cover the desired wager (i.e., includes a monetary balance at least equal to the desired wager).

If the payment server determines that the player's account balance cannot cover the desired wager, the payment server notifies the game server, which then instructs the personal gaming device to display a suitable notification to the player that the player's account balance is too low to place the desired wager. If the payment server determines that the player's account balance can cover the desired wager, the payment server deducts the desired wager from the account balance and notifies the game server. The game server then determines an outcome and any associated award for the play of the game. The game server notifies the payment server of any nonzero award, and the payment server increases the player's account balance by the nonzero award. The game server sends data representing the outcome and any award to the personal gaming device, which displays the outcome and any award.

In certain embodiments, the one or more servers enable web-based game play using a personal gaming device only if the personal gaming device satisfies one or more jurisdictional requirements. In one embodiment, the one or more servers enable web-based game play using the personal gaming device only if the personal gaming device is located within a designated geographic area (such as within certain state or county lines). In this embodiment, the geolocation module of the personal gaming device determines the location of the personal gaming device and sends the location to the one or more servers, which determine whether the personal gaming device is located within the designated geographic area. In various embodiments, the one or more servers enable non-monetary wager-based game play if the personal gaming device is located outside of the designated geographic area.

In various embodiments, the gaming system includes an EGM configured to communicate with a personal gaming device—such as a smartphone, a tablet computer, a desktop computer, or a laptop computer—to enable tethered mobile game play using the personal gaming device. Generally, in these embodiments, the EGM establishes communication with the personal gaming device and enables the player to play games on the EGM remotely via the personal gaming device. In certain embodiments, the gaming system includes a geo-fence system that enables tethered game play within a particular geographic area but not outside of that geographic area. Examples of tethering an EGM to a personal gaming device and geo-fencing are described in U.S. Patent Appl. Pub. No. 2013/0267324, entitled "Remote Gaming Method Allowing Temporary Inactivation Without Terminating Playing Session Due to Game Inactivity".

Social Network Integration

In certain embodiments, the gaming system is configured to communicate with a social network server that hosts or partially hosts a social networking website via a data network (such as the Internet) to integrate a player's gaming experience with the player's social networking account. This enables the gaming system to send certain information to the social network server that the social network server can use to create content (such as text, an image, and/or a video) and post it to the player's wall, newsfeed, or similar area of the social networking website accessible by the player's connections (and in certain cases the public) such that the player's connections can view that information. This also enables the gaming system to receive certain information from the social network server, such as the player's likes or dislikes or the player's list of connections. In certain embodiments, the gaming system enables the player to link the player's player account to the player's social networking account(s). This enables the gaming system to, once it identifies the player and initiates a gaming session (such as via the player logging in to a website (or an application) on the player's personal gaming device or via the player inserting the player's player tracking card into an EGM), link that gaming session to the player's social networking account(s). In other embodiments, the gaming system enables the player to link the player's social networking account(s) to individual gaming sessions when desired by providing the required login information.

For instance, in one embodiment, if a player wins a particular award (e.g., a progressive award or a jackpot award) or an award that exceeds a certain threshold (e.g., an award exceeding $1,000), the gaming system sends information about the award to the social network server to enable the server to create associated content (such as a screenshot of the outcome and associated award) and to post that content to the player's wall (or other suitable area) of the social networking website for the player's connections to see (and to entice them to play). In another embodiment, if a player joins a multiplayer game and there is another seat available, the gaming system sends that information to the social network sever to enable the server to create associated content (such as text indicating a vacancy for that particular game) and to post that content to the player's wall (or other suitable area) of the social networking website for the player's connections to see (and to entice them to fill the vacancy). In another embodiment, if the player consents, the gaming system sends advertisement information or offer information to the social network server to enable the social network server to create associated content (such as text or an image reflecting an advertisement and/or an offer) and to post that content to the player's wall (or other suitable area) of the social networking website for the player's connections to see. In another embodiment, the gaming system enables the player to recommend a game to the player's connections by posting a recommendation to the player's wall (or other suitable area) of the social networking website.

Differentiating Certain Gaming Systems from General Purpose Computing Devices Certain of the gaming systems described herein, such as EGMs located in a casino or another gaming establishment, include certain components and/or are configured to operate in certain manners that differentiate these systems from general purpose computing devices, i.e., certain personal gaming devices such as desktop computers and laptop computers.

For instance, EGMs are highly regulated to ensure fairness and, in many cases, EGMs are configured to award monetary awards up to multiple millions of dollars. To satisfy security and regulatory requirements in a gaming environment, hardware and/or software architectures are implemented in EGMs that differ significantly from those of general purpose computing devices. For purposes of illustration, a description of EGMs relative to general purpose computing devices and some examples of these additional (or different) hardware and/or software architectures found in EGMs are described below.

At first glance, one might think that adapting general purpose computing device technologies to the gaming industry and EGMs would be a simple proposition because both general purpose computing devices and EGMs employ processors that control a variety of devices. However, due to at least: (1) the regulatory requirements placed on EGMs, (2) the harsh environment in which EGMs operate, (3) security requirements, and (4) fault tolerance requirements, adapting general purpose computing device technologies to EGMs can be quite difficult. Further, techniques and methods for solving a problem in the general purpose computing device industry, such as device compatibility and connectivity issues, might not be adequate in the gaming industry. For instance, a fault or a weakness tolerated in a general purpose computing device, such as security holes in software or frequent crashes, is not tolerated in an EGM because in an EGM these faults can lead to a direct loss of funds from the EGM, such as stolen cash or loss of revenue when the EGM is not operating properly or when the random outcome determination is manipulated.

Certain differences between general purpose computing devices and EGMs are described below. A first difference between EGMs and general purpose computing devices is that EGMs are state-based systems. A state-based system stores and maintains its current state in a non-volatile memory such that, in the event of a power failure or other malfunction, the state-based system can return to that state when the power is restored or the malfunction is remedied. For instance, for a state-based EGM, if the EGM displays an award for a game of chance but the power to the EGM fails before the EGM provides the award to the player, the EGM stores the pre-power failure state in a non-volatile memory, returns to that state upon restoration of power, and provides the award to the player. This requirement affects the software and hardware design on EGMs. General purpose computing devices are not state-based machines, and a majority of data is usually lost when a malfunction occurs on a general purpose computing device.

A second difference between EGMs and general purpose computing devices is that, for regulatory purposes, the software on the EGM utilized to operate the EGM has been designed to be static and monolithic to prevent cheating by the operator of the EGM. For instance, one solution that has been employed in the gaming industry to prevent cheating and to satisfy regulatory requirements has been to manufacture an EGM that can use a proprietary processor running instructions to provide the game of chance from an EPROM or other form of non-volatile memory. The coding instructions on the EPROM are static (non-changeable) and must be approved by a gaming regulators in a particular jurisdiction and installed in the presence of a person representing the gaming jurisdiction. Any changes to any part of the software required to generate the game of chance, such as adding a new device driver used to operate a device during generation of the game of chance, can require burning a new EPROM approved by the gaming jurisdiction and reinstalling the new EPROM on the EGM in the presence of a gaming regulator. Regardless of whether the EPROM solution is used, to gain approval in most gaming jurisdictions, an EGM must demonstrate sufficient safeguards that prevent an operator or a player of an EGM from manipulating the EGM's hardware and software in a manner that gives him an unfair, and in some cases illegal, advantage.

A third difference between EGMs and general purpose computing devices is authentication—EGMs storing code are configured to authenticate the code to determine if the code is unaltered before executing the code. If the code has been altered, the EGM prevents the code from being executed. The code authentication requirements in the gaming industry affect both hardware and software designs on EGMs. Certain EGMs use hash functions to authenticate code. For instance, one EGM stores game program code, a hash function, and an authentication hash (which may be encrypted). Before executing the game program code, the EGM hashes the game program code using the hash function to obtain a result hash and compares the result hash to the authentication hash. If the result hash matches the authentication hash, the EGM determines that the game program code is valid and executes the game program code. If the result hash does not match the authentication hash, the EGM determines that the game program code has been altered (i.e., may have been tampered with) and prevents execution of the game program code. Examples of EGM code authentication are described in U.S. Pat. No. 6,962,530, entitled "Authentication in a Secure Computerized Gaming System"; U.S. Pat. No. 7,043,641, entitled "Encryption in a Secure Computerized Gaming System"; U.S. Pat. No. 7,201,662, entitled "Method and Apparatus for Software Authentication"; and U.S. Pat. No. 8,627,097, entitled "System and Method Enabling Parallel Processing of Hash Functions Using Authentication Checkpoint Hashes".

A fourth difference between EGMs and general purpose computing devices is that EGMs have unique peripheral device requirements that differ from those of a general purpose computing device, such as peripheral device security requirements not usually addressed by general purpose computing devices. For instance, monetary devices, such as coin dispensers, bill validators, and ticket printers and computing devices that are used to govern the input and output of cash or other items having monetary value (such as tickets) to and from an EGM have security requirements that are not typically addressed in general purpose computing devices. Therefore, many general purpose computing device techniques and methods developed to facilitate device connectivity and device compatibility do not address the emphasis placed on security in the gaming industry.

To address some of the issues described above, a number of hardware/software components and architectures are utilized in EGMs that are not typically found in general purpose computing devices. These hardware/software components and architectures, as described below in more detail, include but are not limited to watchdog timers, voltage monitoring systems, state-based software architecture and supporting hardware, specialized communication interfaces, security monitoring, and trusted memory.

Certain EGMs use a watchdog timer to provide a software failure detection mechanism. In a normally-operating EGM, the operating software periodically accesses control registers in the watchdog timer subsystem to "re-trigger" the watchdog. Should the operating software fail to access the control registers within a preset timeframe, the watchdog timer will timeout and generate a system reset. Typical watchdog timer circuits include a loadable timeout counter register to enable the operating software to set the timeout interval within a certain range of time. A differentiating feature of some circuits is that the operating software cannot completely disable the function of the watchdog timer. In other words, the watchdog timer always functions from the time power is applied to the board.

Certain EGMs use several power supply voltages to operate portions of the computer circuitry. These can be generated in a central power supply or locally on the computer board. If any of these voltages falls out of the tolerance limits of the circuitry they power, unpredictable operation of the EGM may result. Though most modern general purpose computing devices include voltage monitoring circuitry, these types of circuits only report voltage status to the operating software. Out of tolerance voltages can cause software malfunction, creating a potential uncontrolled condition in the general purpose computing device. Certain EGMs have power supplies with relatively tighter voltage margins than that required by the operating circuitry. In addition, the voltage monitoring circuitry implemented in certain EGMs typically has two thresholds of control. The first threshold generates a software event that can be detected by the operating software and an error condition then generated. This threshold is triggered when a power supply voltage falls out of the tolerance range of the power supply, but is still within the operating range of the circuitry. The second threshold is set when a power supply voltage falls out of the operating tolerance of the circuitry. In this case, the circuitry generates a reset, halting operation of the EGM.

As described above, certain EGMs are state-based machines. Different functions of the game provided by the EGM (e.g., bet, play, result, points in the graphical presentation, etc.) may be defined as a state. When the EGM moves a game from one state to another, the EGM stores critical data regarding the game software in a custom non-volatile memory subsystem. This ensures that the player's wager and credits are preserved and to minimize potential disputes in the event of a malfunction on the EGM. In general, the EGM does not advance from a first state to a second state until critical information that enables the first state to be reconstructed has been stored. This feature enables the EGM to recover operation to the current state of play in the event of a malfunction, loss of power, etc. that occurred just before the malfunction. In at least one embodiment, the EGM is configured to store such critical information using atomic transactions.

Generally, an atomic operation in computer science refers to a set of operations that can be combined so that they appear to the rest of the system to be a single operation with only two possible outcomes: success or failure. As related to data storage, an atomic transaction may be characterized as series of database operations which either all occur, or all do not occur. A guarantee of atomicity prevents updates to the database occurring only partially, which can result in data corruption.

To ensure the success of atomic transactions relating to critical information to be stored in the EGM memory before a failure event (e.g., malfunction, loss of power, etc.), memory that includes one or more of the following criteria be used: direct memory access capability; data read/write capability which meets or exceeds minimum read/write access characteristics (such as at least 5.08 Mbytes/sec (Read) and/or at least 38.0 Mbytes/sec (Write)). Memory devices that meet or exceed the above criteria may be referred to as "fault-tolerant" memory devices.

Typically, battery-backed RAM devices may be configured to function as fault-tolerant devices according to the above criteria, whereas flash RAM and/or disk drive memory are typically not configurable to function as fault-tolerant devices according to the above criteria. Accordingly, battery-backed RAM devices are typically used to preserve EGM critical data, although other types of non-volatile memory devices may be employed. These memory devices are typically not used in typical general purpose computing devices.

Thus, in at least one embodiment, the EGM is configured to store critical information in fault-tolerant memory (e.g., battery-backed RAM devices) using atomic transactions. Further, in at least one embodiment, the fault-tolerant memory is able to successfully complete all desired atomic transactions (e.g., relating to the storage of EGM critical information) within a time period of 200 milliseconds or less. In at least one embodiment, the time period of 200 milliseconds represents a maximum amount of time for which sufficient power may be available to the various EGM components after a power outage event has occurred at the EGM.

As described previously, the EGM may not advance from a first state to a second state until critical information that enables the first state to be reconstructed has been atomically stored. After the state of the EGM is restored during the play of a game of chance, game play may resume and the game may be completed in a manner that is no different than if the malfunction had not occurred. Thus, for example, when a malfunction occurs during a game of chance, the EGM may be restored to a state in the game of chance just before when the malfunction occurred. The restored state may include metering information and graphical information that was displayed on the EGM in the state before the malfunction. For example, when the malfunction occurs during the play of a card game after the cards have been dealt, the EGM may be restored with the cards that were previously displayed as part of the card game. As another example, a bonus game may be triggered during the play of a game of chance in which a player is required to make a number of selections on a video display screen. When a malfunction has occurred after the player has made one or more selections, the EGM may be restored to a state that shows the graphical presentation just before the malfunction including an indication of selections that have already been made by the player. In general, the EGM may be restored to any state in a plurality of states that occur in the game of chance that occurs while the game of chance is played or to states that occur between the play of a game of chance.

Game history information regarding previous games played such as an amount wagered, the outcome of the game, and the like may also be stored in a non-volatile memory device. The information stored in the non-volatile memory may be detailed enough to reconstruct a portion of the graphical presentation that was previously presented on the EGM and the state of the EGM (e.g., credits) at the time the game of chance was played. The game history information may be utilized in the event of a dispute. For example, a player may decide that in a previous game of chance that they did not receive credit for an award that they believed they won. The game history information may be used to reconstruct the state of the EGM before, during, and/or after the disputed game to demonstrate whether the player was correct or not in the player's assertion. Examples of a state-based EGM, recovery from malfunctions, and game history are described in U.S. Pat. No. 6,804,763, entitled "High Performance Battery Backed RAM Interface"; U.S. Pat. No. 6,863,608, entitled "Frame Capture of Actual Game Play"; U.S. Pat. No. 7,111,141, entitled "Dynamic NV-RAM"; and U.S. Pat. No. 7,384,339, entitled, "Frame Capture of Actual Game Play".

Another feature of EGMs is that they often include unique interfaces, including serial interfaces, to connect to specific subsystems internal and external to the EGM. The serial devices may have electrical interface requirements that differ from the "standard" EIA serial interfaces provided by general purpose computing devices. These interfaces may include, for example, Fiber Optic Serial, optically coupled serial interfaces, current loop style serial interfaces, etc. In addition, to conserve serial interfaces internally in the EGM, serial devices may be connected in a shared, daisy-chain fashion in which multiple peripheral devices are connected to a single serial channel.

The serial interfaces may be used to transmit information using communication protocols that are unique to the gaming industry. For example, IGT's Netplex is a proprietary communication protocol used for serial communication between EGMs. As another example, SAS is a communication protocol used to transmit information, such as metering information, from an EGM to a remote device. Often SAS is used in conjunction with a player tracking system.

Certain EGMs may alternatively be treated as peripheral devices to a casino communication controller and connected in a shared daisy chain fashion to a single serial interface. In both cases, the peripheral devices are assigned device addresses. If so, the serial controller circuitry must implement a method to generate or detect unique device addresses. General purpose computing device serial ports are not able to do this.

Security monitoring circuits detect intrusion into an EGM by monitoring security switches attached to access doors in the EGM cabinet. Access violations result in suspension of game play and can trigger additional security operations to preserve the current state of game play. These circuits also function when power is off by use of a battery backup. In power-off operation, these circuits continue to monitor the access doors of the EGM. When power is restored, the EGM can determine whether any security violations occurred while power was off, e.g., via software for reading status registers. This can trigger event log entries and further data authentication operations by the EGM software.

Trusted memory devices and/or trusted memory sources are included in an EGM to ensure the authenticity of the software that may be stored on less secure memory subsystems, such as mass storage devices. Trusted memory devices and controlling circuitry are typically designed to not enable modification of the code and data stored in the memory device while the memory device is installed in the EGM. The code and data stored in these devices may include authentication algorithms, random number generators, authentication keys, operating system kernels, etc. The purpose of these trusted memory devices is to provide gaming regulatory authorities a root trusted authority within the computing environment of the EGM that can be tracked and verified as original. This may be accomplished via removal of the trusted memory device from the EGM computer and verification of the secure memory device contents is a separate third party verification device. Once the trusted memory device is verified as authentic, and based on the approval of the verification algorithms included in the trusted device, the EGM is enabled to verify the authenticity of additional code and data that may be located in the gaming computer assembly, such as code and data stored on hard disk drives. Examples of trusted memory devices are described in U.S. Pat. No. 6,685,567, entitled "Process Verification".

In at least one embodiment, at least a portion of the trusted memory devices/sources may correspond to memory that cannot easily be altered (e.g., "unalterable memory") such as EPROMS, PROMS, Bios, Extended Bios, and/or other memory sources that are able to be configured, verified, and/or authenticated (e.g., for authenticity) in a secure and controlled manner.

According to one embodiment, when a trusted information source is in communication with a remote device via a network, the remote device may employ a verification scheme to verify the identity of the trusted information source. For example, the trusted information source and the remote device may exchange information using public and private encryption keys to verify each other's identities. In another embodiment, the remote device and the trusted information source may engage in methods using zero knowledge proofs to authenticate each of their respective identities.

EGMs storing trusted information may utilize apparatuses or methods to detect and prevent tampering. For instance, trusted information stored in a trusted memory device may be encrypted to prevent its misuse. In addition, the trusted memory device may be secured behind a locked door. Further, one or more sensors may be coupled to the memory device to detect tampering with the memory device and provide some record of the tampering. In yet another example, the memory device storing trusted information might be designed to detect tampering attempts and clear or erase itself when an attempt at tampering has been detected. Examples of trusted memory devices/sources are described in U.S. Pat. No. 7,515,718, entitled "Secured Virtual Network in a Gaming Environment".

Mass storage devices used in a general purpose computing devices typically enable code and data to be read from and written to the mass storage device. In a gaming environment, modification of the gaming code stored on a mass storage device is strictly controlled and would only be enabled under specific maintenance type events with electronic and physical enablers required. Though this level of security could be provided by software, EGMs that include mass storage devices include hardware level mass storage data protection circuitry that operates at the circuit level to monitor attempts to modify data on the mass storage device and will generate both software and hardware error triggers should a data modification be attempted without the proper electronic and physical enablers being present. Examples of using a mass storage device are described in U.S. Pat. No. 6,149,522, entitled "Method of Authenticating Game Data Sets in an Electronic Casino Gaming System".

Various changes and modifications to the present embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A device comprising:

a communication interface operable to serially communicate, in accordance with a slot accounting system protocol, with a master gaming controller of an electronic gaming machine that is distinct from the device;

a processor; and a memory device that stores a plurality of instructions that, when executed by the processor, cause the processor to:

receive, via the communication interface and from the electronic gaming machine operating independent of the device, electronic gaming machine generated data associated with a status of the electronic gaming machine, and broadcast, based on the received electronic gaming machine generated data, electronic gaming machine status data associated with the status of the electronic gaming machine, wherein responsive to a messaging event occurring, a mobile device displays, based on the broadcast electronic gaming machine status data, information associated with the status of the electronic gaming machine.

2. The device of claim 1, wherein the information is associated with at least one of: game data of the electronic gaming machine, persistence gameplay data of the electronic gaming machine, historic game data of the electronic gaming machine, ongoing promotional data of the electronic gaming machine, and historic promotional data of the electronic gaming machine.

3. The device of claim 1, wherein the information comprises a setting of the electronic gaming machine.

4. The device of claim 1, wherein the information comprises a non-gameplay service available in association with the electronic gaming machine.

5. The device of claim 1, wherein the information is associated with historical placement data of the electronic gaming machine.

6. The device of claim 1, wherein the messaging event occurs when the broadcast electronic gaming machine status data is different from data previously received by the mobile device.

7. The device of claim 1, wherein the messaging event occurs when the broadcast electronic gaming machine status data is associated with a satisfaction of a condition.

8. The device of claim 7, wherein the condition is set in association with the mobile device.

9. The device of claim 1, wherein the broadcast electronic gaming machine status data is associated with data that facilitates a wireless connection with the mobile device.

10. A gaming establishment component comprising:

a communication interface operable to serially communicate, in accordance with a slot accounting system protocol, with a master gaming controller of an electronic gaming machine that is distinct from and associated with the gaming establishment component;

a processor; and a memory device that stores a plurality of instructions that, when executed by the processor, cause the processor to:

receive, via the communication interface and from the electronic gaming machine operating independent of the gaming establishment component, electronic gaming machine generated data associated with an attribute of the electronic gaming machine, broadcast a data set comprising each of:

connection data utilized to establish a wireless connection with a mobile device, supplemental data utilized to enable the mobile device to display information associated with the attribute of the electronic gaming machine.

11. The gaming establishment component of claim 10, wherein the information is associated with at least one of: game data of the electronic gaming machine, persistence gameplay data of the electronic gaming machine, historic game data of the electronic gaming machine, ongoing promotional data of the electronic gaming machine, and historic promotional data of the electronic gaming machine.

12. A method of operating a device, the method comprising:

receiving, via a communication interface and from an electronic gaming machine, electronic gaming machine generated data associated with a status of the electronic gaming machine, wherein the communication interface is operable to serially communicate, in accordance with a slot accounting system protocol, with the electronic gaming machine and the device is distinct from and operates independent of the electronic gaming machine, and broadcasting, based on the received electronic gaming machine generated data, electronic gaming machine status data associated with the status of the electronic gaming machine, wherein responsive to a messaging event occurring, a mobile device displays, based on the broadcast electronic gaming machine status data, information associated with the status of the electronic gaming machine.

13. The method of claim 12, wherein the information is associated with at least one of: game data of the electronic gaming machine, persistence gameplay data of the electronic gaming machine, historic game data of the electronic gaming machine, ongoing promotional data of the electronic gaming machine, and historic promotional data of the electronic gaming machine.

14. The method of claim 12, wherein the information comprises a setting of the electronic gaming machine.

15. The method of claim 12, wherein the information comprises a non-gameplay service available in association with the electronic gaming machine.

16. The method of claim 12, wherein the information is associated with historical placement data of the electronic gaming machine.

17. The method of claim 12, wherein the messaging event occurs when the broadcast electronic gaming machine status data is different from data previously received by the mobile device.

18. The method of claim 12, wherein the messaging event occurs when the broadcast electronic gaming machine status data is associated with a satisfaction of a condition.

19. The method of claim 18, wherein the condition is set in association with the mobile device.

20. The method of claim 12, wherein the broadcast electronic gaming machine status data is associated with data that facilitates a wireless connection with the mobile device.

* * * * *